United States Patent
Ono

[19]

[11] Patent Number: 6,133,941
[45] Date of Patent: Oct. 17, 2000

[54] CAMERA CONTROL SYSTEM, APPARATUS, AND METHOD WHICH INCLUDES A CAMERA CONTROL SERVER THAT RECEIVES CAMERA CONTROL REQUESTS FROM CLIENTS AND ISSUES CONTROL AUTHORITY AND WAIT TIMES FOR CONTROL OF CAMERA TO CLIENTS

[75] Inventor: Eita Ono, Tokyo, Japan

[73] Assignee: Canon Kabushiki Kaisha, Tokyo, Japan

[21] Appl. No.: 08/956,552

[22] Filed: Oct. 23, 1997

[30] Foreign Application Priority Data

Oct. 25, 1996 [JP] Japan .................................... 8-284449

[51] Int. Cl.[7] ..................................... H04N 7/15
[52] U.S. Cl. ............................. 348/15; 348/143; 348/156
[58] Field of Search .............................. 348/15, 156, 153, 348/159, 143, 212, 213, 211; 370/443, 444; 379/265, 266, 269, 93.21, 202; 709/208, 210, 225, 237, 253

[56] References Cited

U.S. PATENT DOCUMENTS

| | | | |
|---|---|---|---|
| 4,727,539 | 2/1988 | Arita et al. .............................. | 370/461 |
| 5,297,144 | 3/1994 | Gilbert et al. .......................... | 370/346 |
| 5,416,780 | 5/1995 | Patel ....................................... | 379/210 |
| 5,530,860 | 6/1996 | Matsuura ................................ | 709/105 |
| 5,604,748 | 2/1997 | Date et al. .............................. | 370/449 |
| 5,675,738 | 10/1997 | Suzuki et al. ............................ | 348/13 |
| 5,696,809 | 12/1997 | Voit ......................................... | 379/265 |
| 5,745,161 | 4/1998 | Ito ............................................ | 348/15 |
| 5,745,167 | 4/1998 | Kageyu et al. ......................... | 348/153 |
| 5,757,418 | 5/1998 | Inagaki ................................... | 348/15 |
| 5,821,984 | 10/1998 | Ito et al. ................................. | 348/15 |
| 5,867,572 | 2/1999 | MacDonald et al. .................. | 379/266 |
| 5,892,769 | 4/1999 | Lee ......................................... | 370/447 |
| 5,894,472 | 4/1999 | De Seze ................................. | 370/458 |
| 5,894,572 | 4/1999 | Martin ................................... | 709/102 |

FOREIGN PATENT DOCUMENTS

| | | | | |
|---|---|---|---|---|
| 406133310A | 5/1994 | Japan | .............................. | H04N 7/15 |
| 406233298A | 8/1994 | Japan | .............................. | H04N 7/15 |
| 406284420A | 10/1994 | Japan | .............................. | H04N 7/15 |
| 406303607A | 10/1994 | Japan | .............................. | H04N 7/15 |

*Primary Examiner*—Wendy Garber
*Assistant Examiner*—Mitchell White
*Attorney, Agent, or Firm*—Morgan & Finnegan, LLP

[57] ABSTRACT

In a system including a server to which a camera is connected, and clients which can remote-control the image pickup conditions of the camera, the server generates a message indicating a state associated with the camera control authority, and issues it to the individual clients. When each client determines that the received message is the one indicating the state associated with the camera control, it acquires the control authority status and its remained time from the received message, counts the remained time, and displays the remained time.

26 Claims, 21 Drawing Sheets

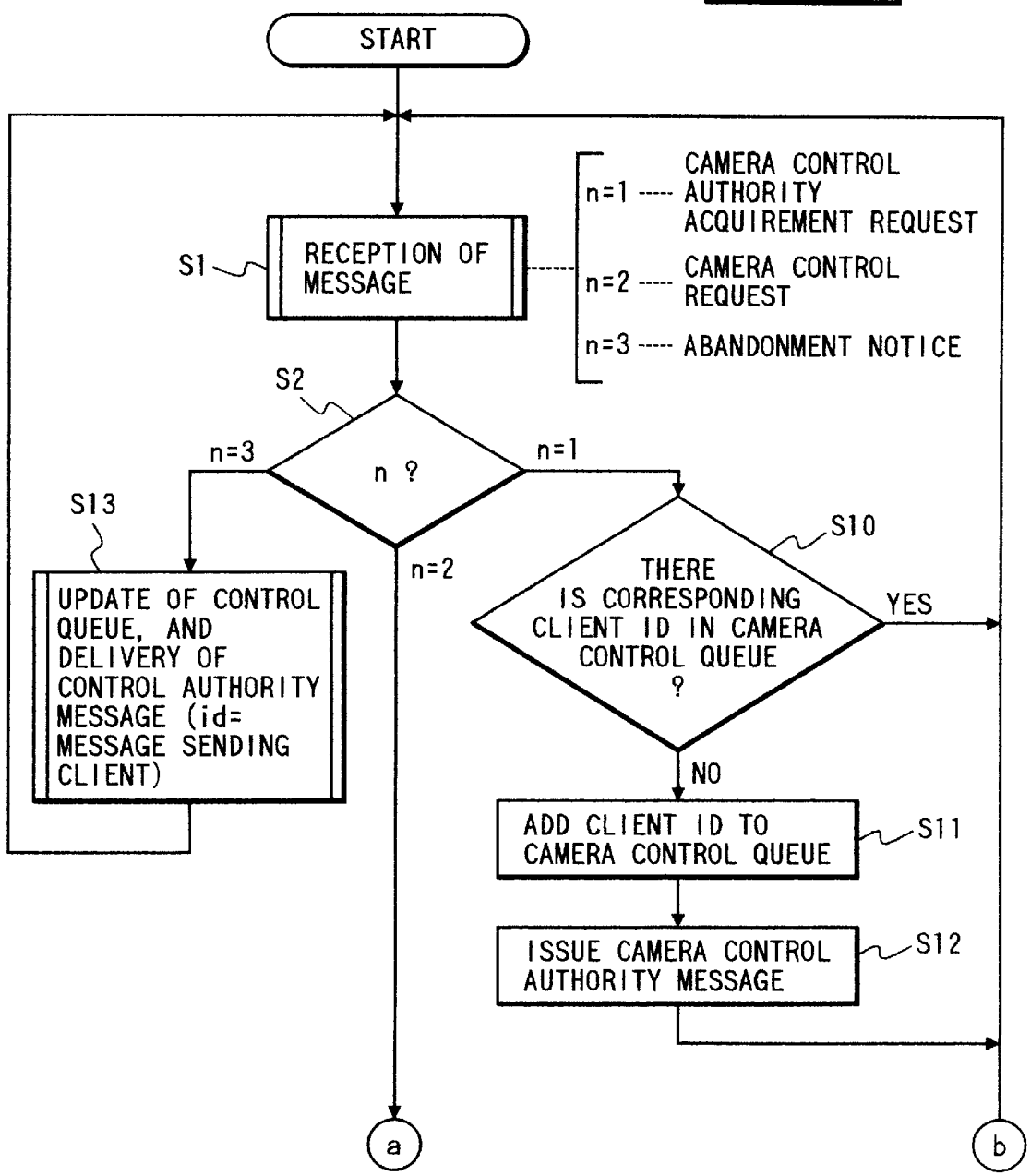

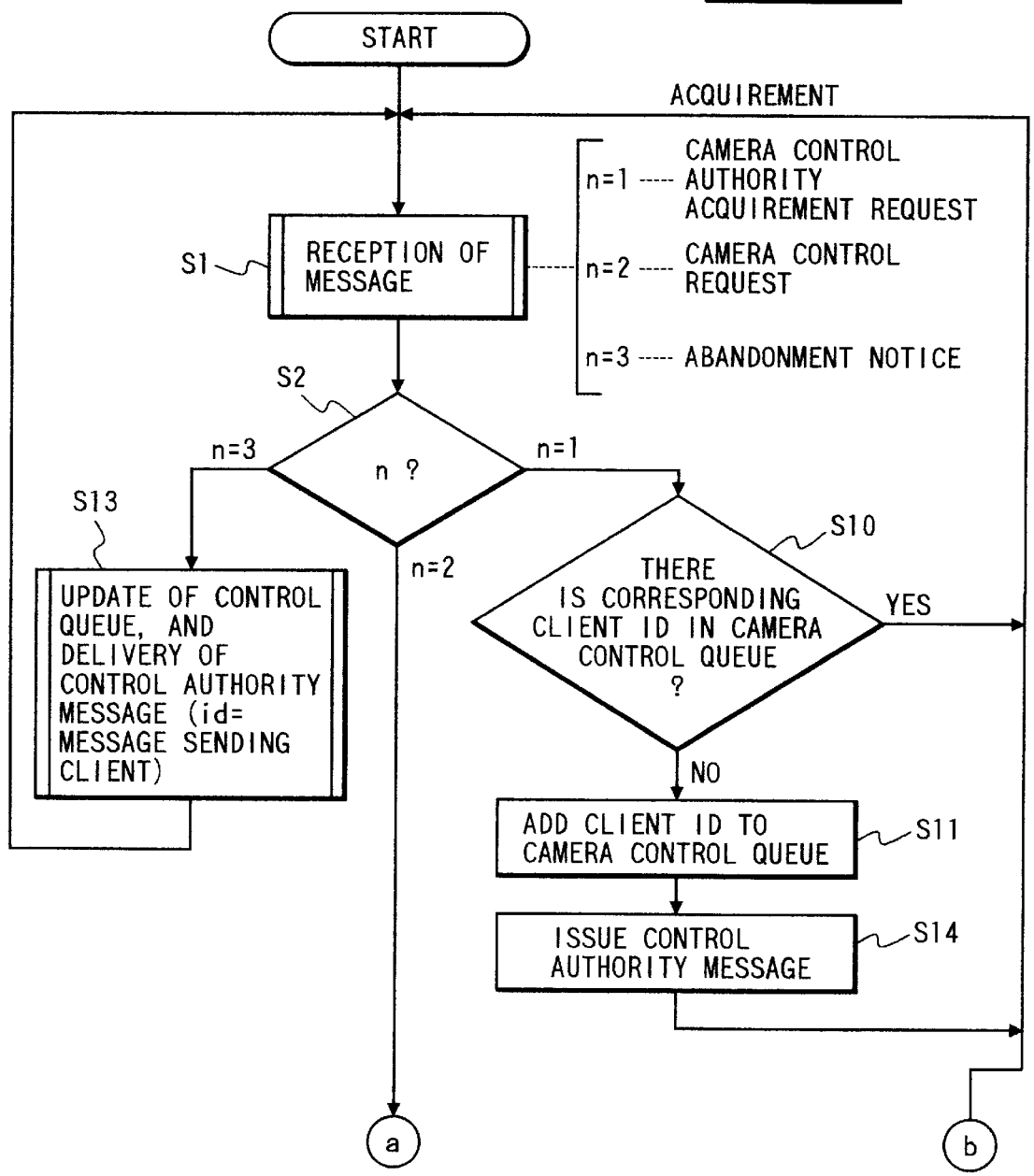

FIG. 19

| CAMERA CONTROL CLIENT ID | PRIORITY | MAXIMUM POSSESSION TIME |
|---|---|---|
| 101 | 3 | 15 |
| 105 | 5 | 20 |
| 112 | 2 | 10 |
| | | |
| | | |

CAMERA CONTROL SYSTEM, APPARATUS, AND METHOD WHICH INCLUDES A CAMERA CONTROL SERVER THAT RECEIVES CAMERA CONTROL REQUESTS FROM CLIENTS AND ISSUES CONTROL AUTHORITY AND WAIT TIMES FOR CONTROL OF CAMERA TO CLIENTS

BACKGROUND OF THE INVENTION

1. Field of the Invention

The present invention relates to a camera control system, apparatus, and method, which can change the image pickup conditions and the like of a camera by remote control.

2. Related Background Art

Conventionally, a camera control system such as a monitor camera system that can control a video input device from a remote place is known. In such system, it is a common practice to control a plurality of cameras by a single supervisor. That is, the number of video input devices is larger than that of supervisors, and a plurality of supervisors never control a single video input device.

In recent years, since the Internet and the like have become prevalent, a demand has arisen for observing an image captured by a single video input device or controlling the video input device by a plurality of users. In such case, a mechanism for managing control requests from remote places to a plurality of video input devices is required. When a plurality of users want to control a single video input device, control requests may collide among the plurality of users. Hence, the control authority to the video input device must be appropriately managed and controlled.

In consideration of such technical trend, Japanese Patent Application No. 08-192585 has proposed a camera control system which manages control requests and the control authority to a camera, so that users who requested the camera control authority can be granted the camera control authority in turn with an elapse of time, and can control the camera.

In the camera control system of the above reference, when a plurality of users (client devices) issue camera control authority requests to a camera control device, the camera control device appropriately controls the passing of the camera control authority among the plurality of client devices. For this reason, the control authority of the video input device and its possession can be managed according to the time elapsed, and many users can control a single camera.

SUMMARY OF THE INVENTION

It is an object of the present invention to further improve the operability of each client device in the above-mentioned camera control system.

In order to achieve the above object, according to one aspect of the present invention, there is provided a camera control system which allows a remote client to control a video camera, comprising:

a camera control server for controlling the video camera connected thereto, the camera control server including
registration means which can register a plurality of clients which issued acquirement requests of a control authority in a queue for acquiring the control authority of the video camera,
calculation means for calculating wait times until acquirement of the control authority for clients which are registered by the registration means and have no control authority, and
output means for outputting the wait times calculated by the calculation means to the corresponding clients; and a client which can control the video camera from a remote place, the client including
issuance means for issuing an acquirement request of the control authority to the camera control server,
count means for counting a wait time until acquirement of the control authority of the video camera on the basis of the wait time received from the camera control server, and
display means for displaying the wait time counted by the count means.

According to another aspect of the present invention, there is provided a camera control server for controlling a video camera on the basis of a control command from a remote client, comprising:

registration means which can register a plurality of clients which issued acquirement requests of a control authority in a queue for acquiring the control authority of the video camera;
calculation means for calculating wait times until acquirement of the control authority for clients which are registered by the registration means and have no control authority; and
output means for outputting the wait times calculated by the calculation means to the corresponding clients.

According to still another aspect of the present invention, there is provided a method of controlling a camera control system which allows a remote client to control a video camera, comprising:

an issuance step of issuing an acquirement request of a control authority on the client side;
a registration step of allowing to register a plurality of clients which issued the acquirement requests of the control authority in a queue for acquiring the control authority of the video camera;
a calculation step of calculating wait times until acquirement of the control authority for clients which are registered in the registration step and have no control authority;
an output step of outputting the wait times calculated in the calculation step to the corresponding clients;
a count step of counting a wait time until acquirement of the control authority of the video camera on the basis of the wait time received from a camera control server; and
a display step of displaying the wait time counted in the count step.

According to still another aspect of the present invention, there is provided a storage medium that stores a program for implementing processing of a camera control server for controlling a video camera on the basis of a control command from a remote client, the storage medium storing programs for implementing the processing steps of:

allowing to register a plurality of clients which issued acquirement requests of a control authority in a queue upon acquiring the control authority of the video camera;
calculating wait times until acquirement of the control authority for clients which are registered in the queue and have no control authority; and
outputting the wait times to the corresponding clients.

According to still another aspect of the present invention, there is provided a client which can remote-control a video camera connected to a camera server, comprising:

issuance means for issuing an acquirement request of a control authority to the camera control server;

reception means for, when the client has no control authority, receiving a wait time until acquirement of the control authority calculated by the camera server;

count means for counting a wait time until acquirement of the control authority of the video camera on the basis of the wait time received by the reception means; and display means for displaying the wait time counted by the count means.

Other objects and features of the present invention will become apparent from the following specification and the accompanying drawings.

BRIEF DESCRIPTION OF THE DRAWINGS

FIG. 19 shows a table in which the priority levels of clients are registered.

DESCRIPTION OF THE PREFERRED EMBODIMENTS

The preferred embodiments of the present invention will be described hereinafter with reference to the accompanying drawings.

Figure 1:
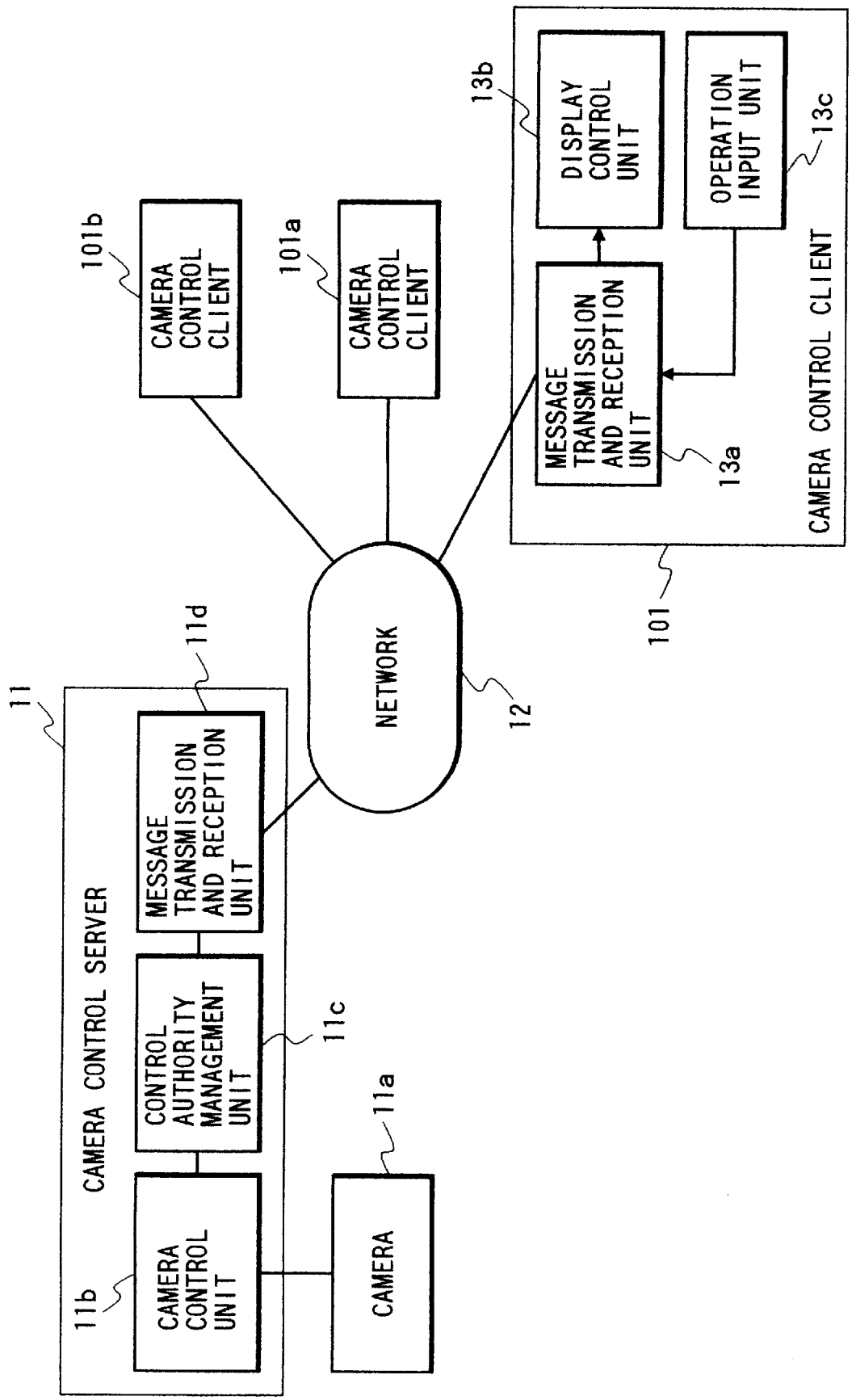
FIG. 1 is a block diagram showing the arrangement of a camera control system according to the first embodiment of the present invention.

FIG. 1 is a block diagram showing the arrangement of a camera control system according to the first embodiment of the present invention. A camera control server 11 makes camera control. A network 12 comprises a LAN, WAN, Internet, or the like. Camera control clients 101, 101a, and 101b issue camera control commands from remote places.

In the camera control server 11, a camera 11a picks up an image, and its pan and tilt angles, zoom ratio, and the like can be controlled by external commands. A camera control unit 11b controls the camera in accordance with a request from a remote place. A control authority management unit 11c manages the camera control authority with respect to control authority requests from a plurality of camera control clients. A message transmission and reception unit 11d acquires messages from the camera control clients 101, 101a, 101b, and the like via the network 12, and transmits messages to these camera control clients.

In the camera control client 101 (to be also simply referred to as a client hereinafter), a message transmission and reception unit 13a exchanges messages with the camera control server 11 via the network 12. A display control unit 13b displays an image, control status, and the like received from the camera control server 11. An operation input unit 13c inputs an acquirement request instruction of the camera control authority, change instructions of the pan and tilt angles and zoom ratio of the camera 11a, and the like to the camera control server 11.

In the arrangement shown in FIG. 1, the numbers of camera control servers and camera control clients are not limited to those in FIG. 1, and a plurality of cameras may be connected to the camera control server 11.

The camera control system of the first embodiment will be described in more detail below. First, the arrangement and operation of the camera control server will be explained, and then, those of the camera control client will be explained.

Figure 2:
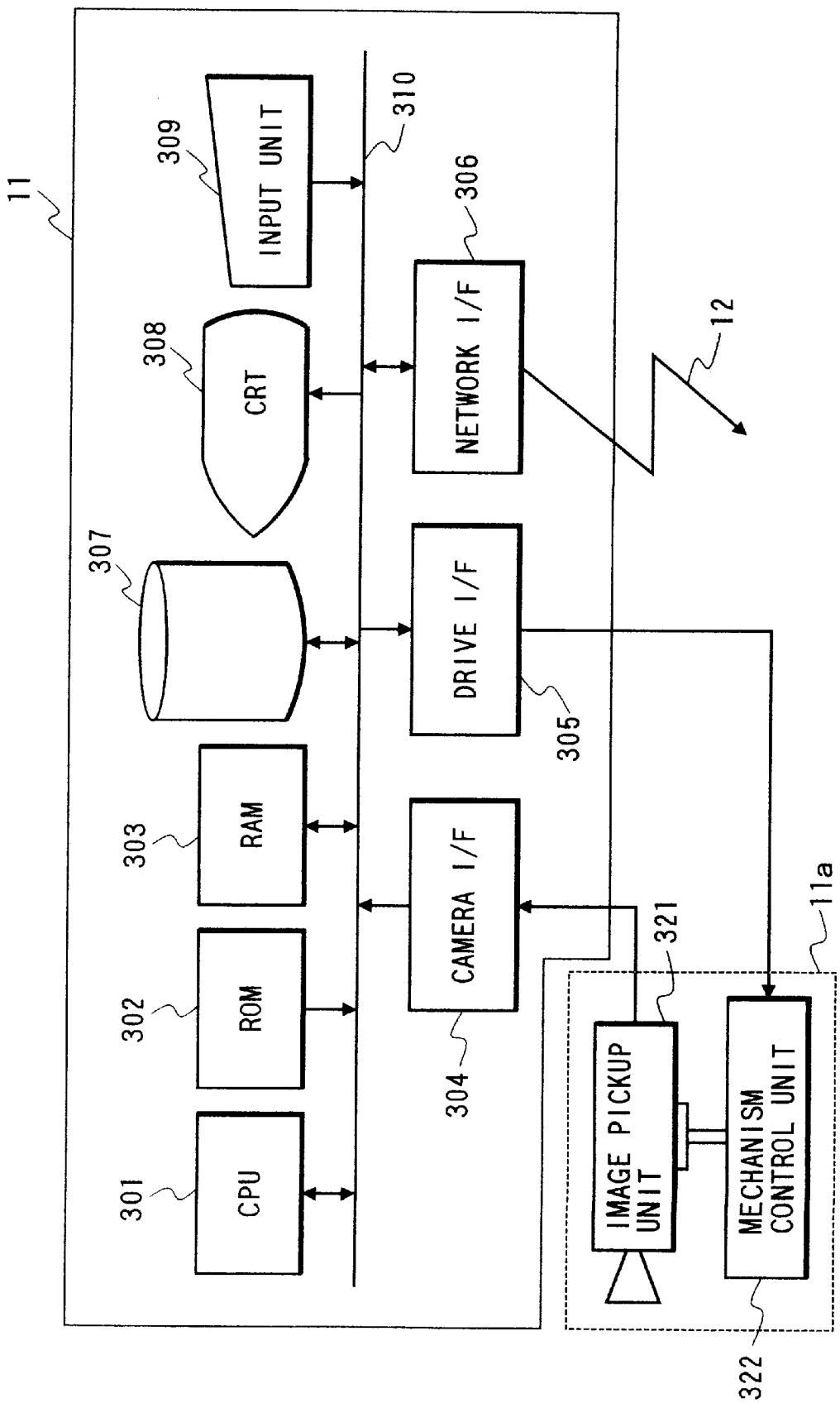
FIG. 2 is a block diagram showing the arrangement of a camera control server of the first embodiment.

FIG. 2 is a block diagram showing the arrangement of the camera control server of this embodiment. In FIG. 2, a CPU 301 makes various kinds of control in the camera control server. A ROM 302 stores various control programs to be executed by the CPU 301. A RAM 303 provides a work area required when the CPU 301 executes various kinds of control. A camera interface (I/F) 304 receives a video signal from the camera 11a. A drive I/F 305 controls the pan and tilt angles, zoom ratio, and the like of the camera 11a.

A network I/F 306 implements communications with other devices (the camera control client 101, and the like) connected to the network 12. An external storage device 307 comprises, e.g., a hard disk or the like. A CRT 308 performs various kinds of display under the control of the CPU 301. An input unit 309 such as a keyboard is used for making various inputs to the CPU 301. A bus 310 connects the above-mentioned components.

In the above arrangement, the CPU 301 may load a control program stored in the external storage device 307 onto the RAM 303, and may execute the loaded control program. Also, the external storage device 307, CRT 308, and input unit 309 are option devices, and may be omitted if they are not necessary. Furthermore, the camera control unit 11b, the control authority management unit 11c, and message transmission and reception unit 11d correspond to functions which are implemented when the CPU 301 executes a control program stored in the ROM 302 or a control program loaded onto the RAM 303.

Moreover, the camera 11a comprises an image pickup unit 321 for outputting a video signal to the camera I/F 304, and a mechanism control unit 322 for controlling panning, tilting, zooming, and the like of the image pickup unit 321 in accordance with a control signal input via the drive I/F 305.

In the camera control system of this embodiment with the above-mentioned arrangement, the control authority management unit 11c of the camera control server 11 manages control requests from a plurality of camera control clients to the camera 11a, and controls grant of the control authority to each client.

Figure 3:
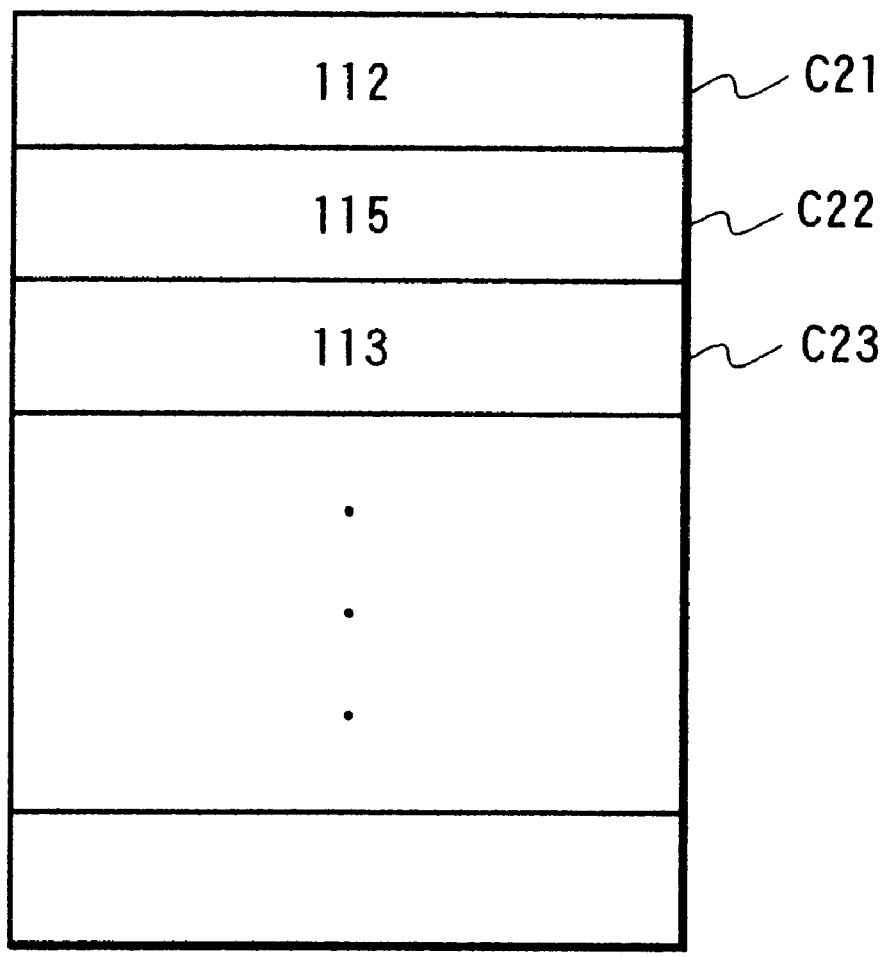
FIG. 3 shows the format of a camera control queue in the first embodiment.

The control authority management unit 11c has a camera control queue for managing grant of the camera control authority to each client. FIG. 3 shows the format of the camera control queue in the first embodiment. This camera control queue is stored in the RAM 303, and queues IDs of clients which issued the camera control requests. A head element C21 (ID=112) in the queue indicates a client which is currently in possession of the camera control authority. An element C22 indicates the ID of the next client which is to be granted the camera control authority, and an element C23 indicates the ID of a client which is to be granted the camera control authority after the client indicated by C22.

Figure 4A:
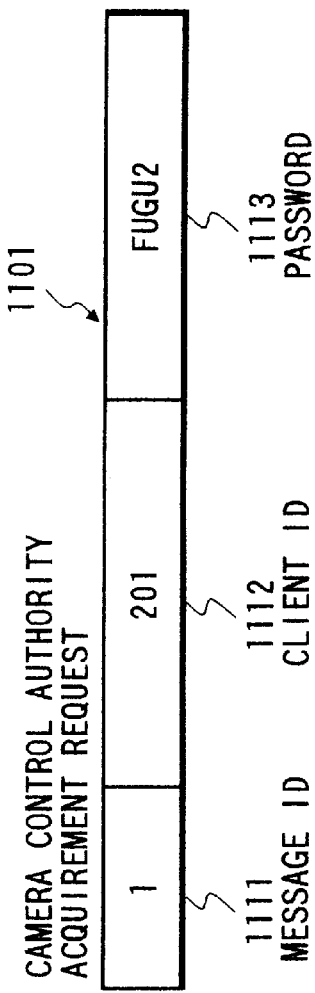
FIGS. 4A, 4B and 4C are explanatory views of the formats of messages sent from a camera control client to the camera control server.
Figure 4B:
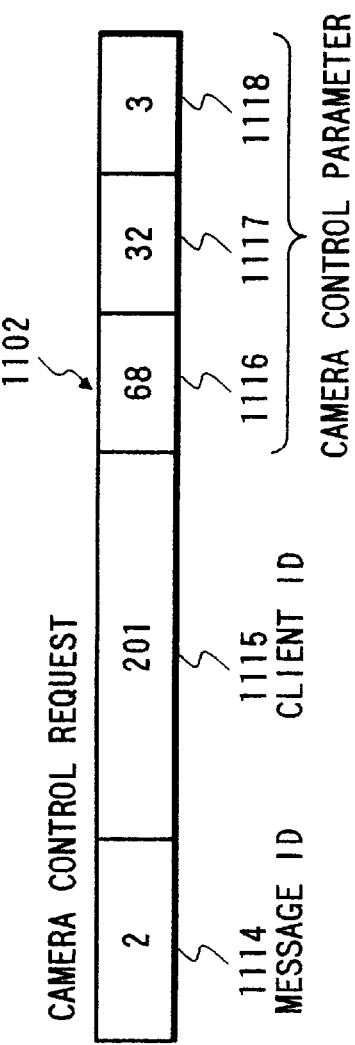
Figure 4C:
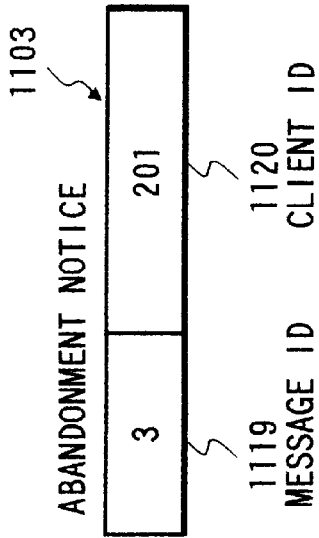

The camera control client 101 (to be simply referred to as a client 101 hereinafter) at a remote place and the like, and the camera control server 11 exchange various messages. The messages sent from the client 101 include three different messages, i.e., a camera control authority acquirement request, a camera control request, and an abandonment notice (a notice for abandoning the camera control authority itself or its acquirement request state). FIGS. 4A to 4C are views for explaining the formats of messages sent from the camera control client to the camera control server. FIG. 4A shows the format of the camera control authority acquirement request message, FIG. 4B that of the camera control request message, and FIG. 4C that of the abandonment notice message. Each message has a message ID indicating the type of that message, and a client ID indicating a client as the source of that message. The formats of the messages will be explained below.

A camera control authority acquirement request 1101 has "1" in a message ID 1111, and is made up of the message ID 1111, a client ID 1112, and a password 1113. A camera control request 1102 has "2" in a message ID 1114, and is made up of the message ID 1114, a client ID 1115, and parameter values of a pan angle 1116, tilt angle 1117, and zoom ratio 1118. An abandonment notice 1103 has "3" in a message ID 1119, and is made up of the message ID 1119 and a client ID 1120.

The client 101 issues a camera control authority acquirement request 1101 to the camera control server 11 via the network 12 when it wants to control the camera 11a. Thereafter, the client 101 sends a control request 1102 including pan and tilt angles, zoom ratio, and the like. When the client 101 gives up acquirement of the camera control authority or abandons the acquired camera control authority, it issues an abandonment notice 1103 to the camera server 11.

Figure 5A:
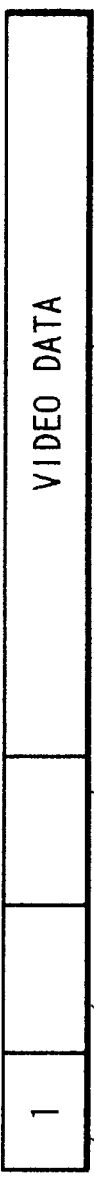
FIGS. 5A, 5B and 5C are explanatory views of the formats of messages sent from the camera control server to the camera control client.
Figure 5B:
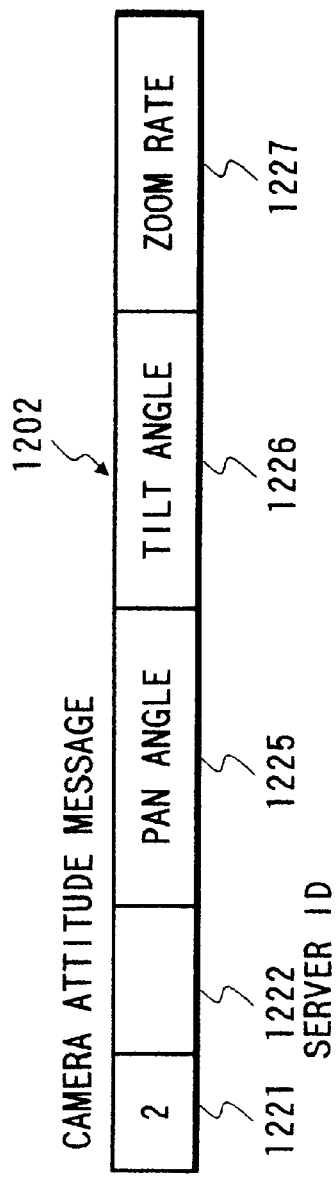
Figure 5C:
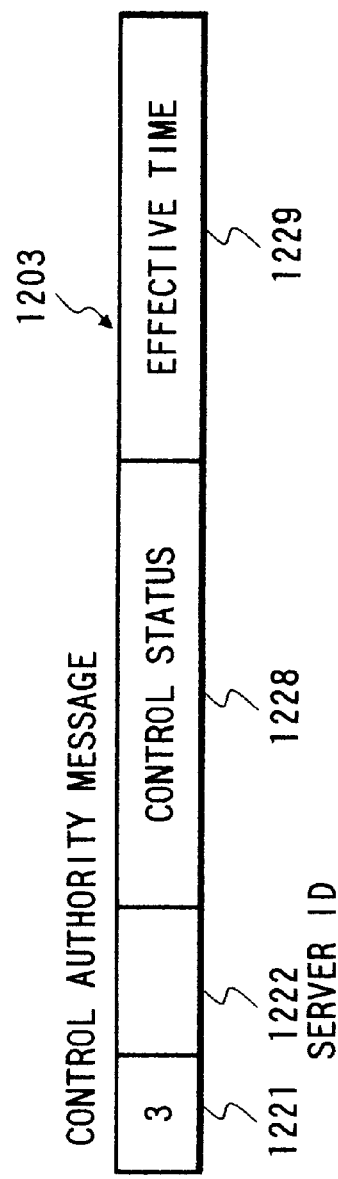

On the other hand, messages to be issued from the camera control server 11 to each client include three different messages, i.e., a video data message, a camera attitude message, and a control authority message. FIGS. 5A to 5C are views for explaining the formats of messages sent from the camera control server to the camera control client. FIG. 5A shows the format of a video data message 1201, FIG. 5B that of a camera attitude message 1202, and FIG. 5C that of a control authority message 1203. Each message has a message ID 1221 indicating the type of that message, and a server ID 1222 indicating the camera control server as the source of that message. The formats of the messages will be explained below.

The video data message 1201 has "1" as the message ID 1221. Attribute information 1223 indicates attributes (for example, the frame rate, the type of compression processing if it is done, and the like) of video data 1224 attached to that video data message. The video data 1224 is the one sensed by the camera 11a. The video data message 1201 is issued to each camera control client which has accessed the camera control server as needed.

The camera attitude message 1202 has "2" as the message ID 1221, and also has a pan angle 1225, tilt angle 1226, and zoom ratio 1227 as values that represent the camera attitude. The control authority message 1203 has "3" as the message ID 1221, and also has control status data 1228 and effective time data 1229. Note that the control status 1228 indicates the control authority status of that client with respect to the camera, i.e., indicates one of "control authority being requested", "control authority is possessed", and "no control authority". The effective time data 1229 indicates the predicted wait time when the control status indicates "control authority being requested", and it indicates the predicted remained time of the state wherein the client can possess the control authority when the control status indicates "control authority is possessed". The method of using these messages and their issuance timings will be explained in turn later.

Figure 6B:
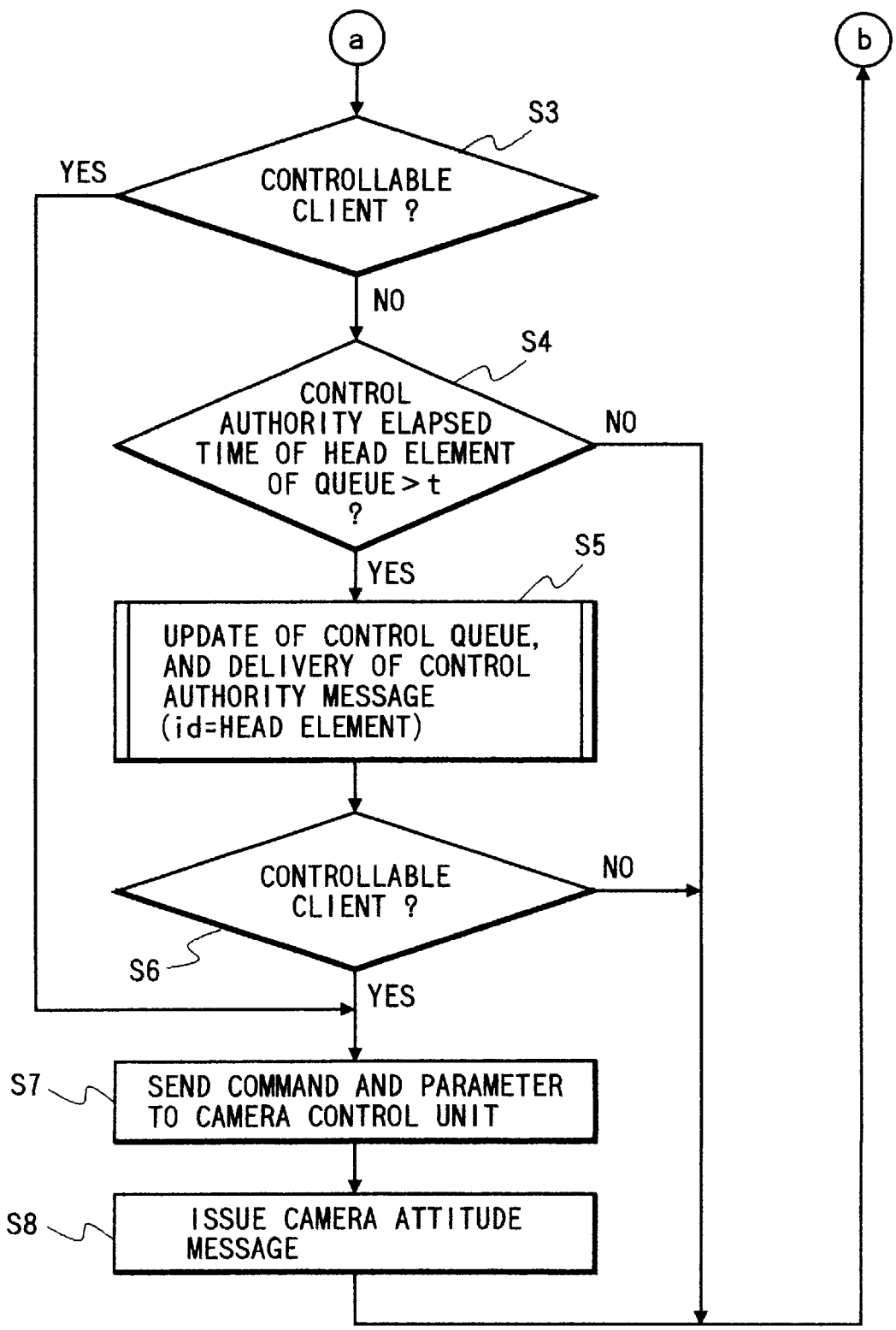
FIG. 6 comprised of FIGS. 6A and 6B, is a flow chart showing the control sequence of the camera control server in the first embodiment.

FIGS. 6A and 6B are flow charts showing the control sequence of the camera control server in the first embodiment. This flow chart shows the processing to be executed by the camera control server 11 upon receiving a message.

When the message transmission and reception unit 11d receives a message (step S1), it transfers the received message to the control authority management unit 11c. The control authority management unit 11c determines the type of that message based on the message ID included in the message (step S2). As a result, if it is determined that the message is a camera control authority acquirement request (message ID="1"), it is checked if the corresponding client ID is stored in the camera control queue (step S10). If NO in step S10, the client ID is added to the camera control queue (step S11). In step S12, the message transmission and reception unit 11d issues a control authority message 1203 to the client as the source of that message.

Status "control authority is being requested" indicating the control authority queued state is set in the control status 1228 in the control authority message 1203 issued in step S12. Also, in the effective time 1229, the sum of the remained control time of the head element in the camera control queue (FIG. 3) at that time, and the product of the number of other elements registered in the camera control queue and a maximum possession time t is set. That is, the effective time is given by:

($t$–control authority elapsed time of head element)+($t$×(number of queued elements–2))

The reason why "2" is subtracted from the number of queued elements is to subtract the head element and the element of the corresponding client added in step S11 from the number of queued elements.

On the other hand, if it is determined that the message is a camera control request (message ID="2"), it is checked if the client which issued that request corresponds to the head element in the camera control queue (step S3). If the client corresponds to the head element in the camera control queue, since camera control is permitted, a camera control command and parameters are generated on the basis of the camera control request message 1102, and are sent to the camera control unit 11b (step S7). On the other hand, if the client does not correspond to the head element in the camera control queue, it is checked if the elapsed possession time of the current control authority of the head element in the camera control queue is larger than the predetermined time t (step S4).

If the possession time of the control authority of the current head element (the current controllable client) in the queue is equal to or smaller than the maximum time t of possession of the control authority, since the control authority is kept granted to the head element, this processing ends. That is, the camera control request message received in step S1 is abandoned.

On the other hand, if the possession time of the control authority of the current head element in the queue becomes larger than t, subroutine SubA is executed using the head element in the control queue as an argument id so as to update the control queue and to issue a control authority message (step S5).

Figure 7:
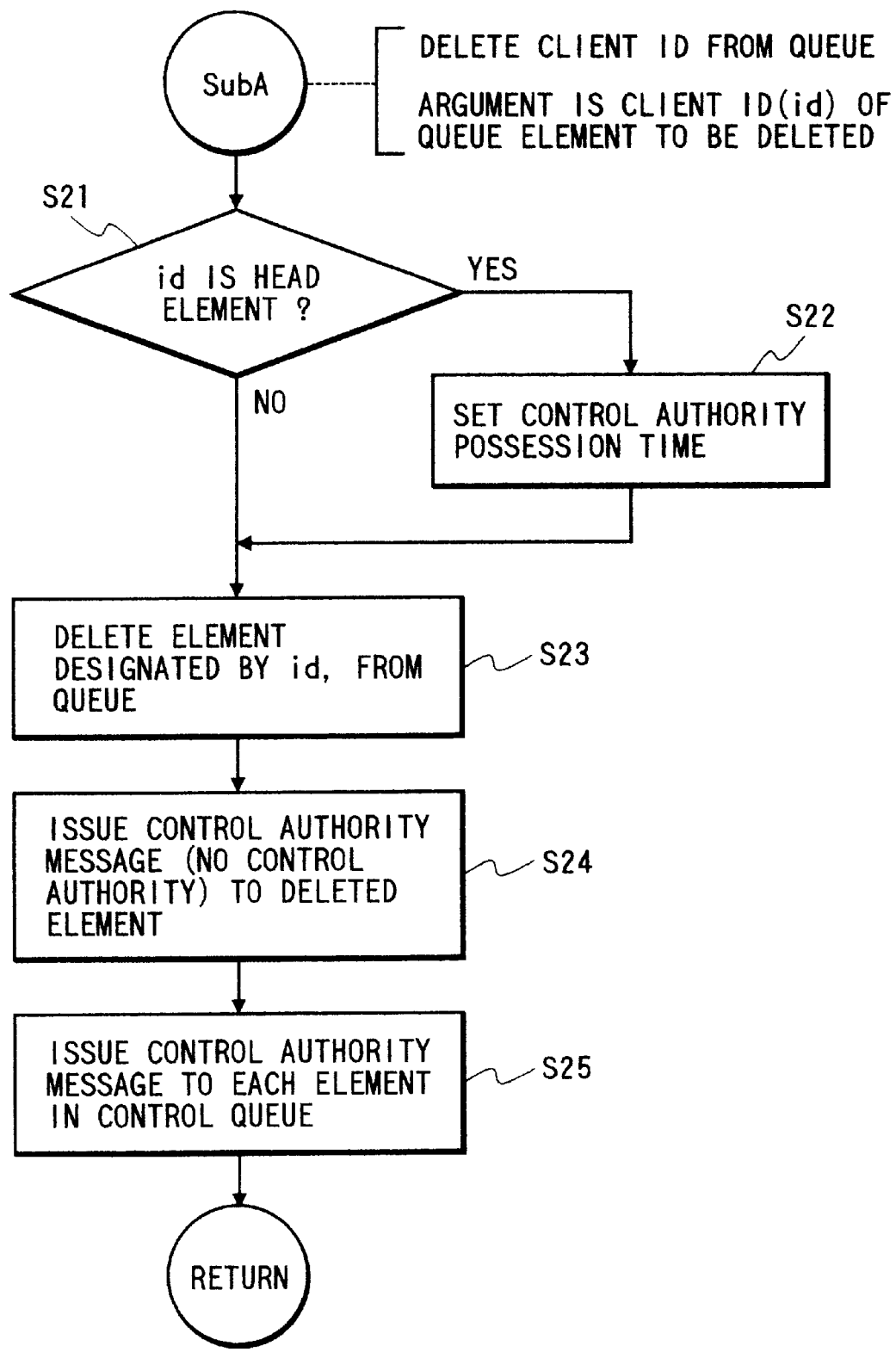
FIG. 7 is a flow chart showing the control sequence in subroutine SubA.

FIG. 7 is a flow chart showing the control sequence in subroutine SubA. It is checked if the argument id is the head element (step S21). Since the head element is given to the argument id in step S5, the flow advances to step S22. In step S22, the control authority possession time is set again to measure the control authority elapsed time of the next controllable client. The element designated by id is deleted from the camera control queue (step S23). In this case, the head element (C21 in FIG. 3) is deleted from the camera control queue.

Furthermore, in step S24, a control authority message including control status data 1228 set with "no control authority" is issued to the client corresponding to the deleted element. In step S25, control authority messages 1203 are issued to clients corresponding to elements registered in the control queue.

Figure 8:
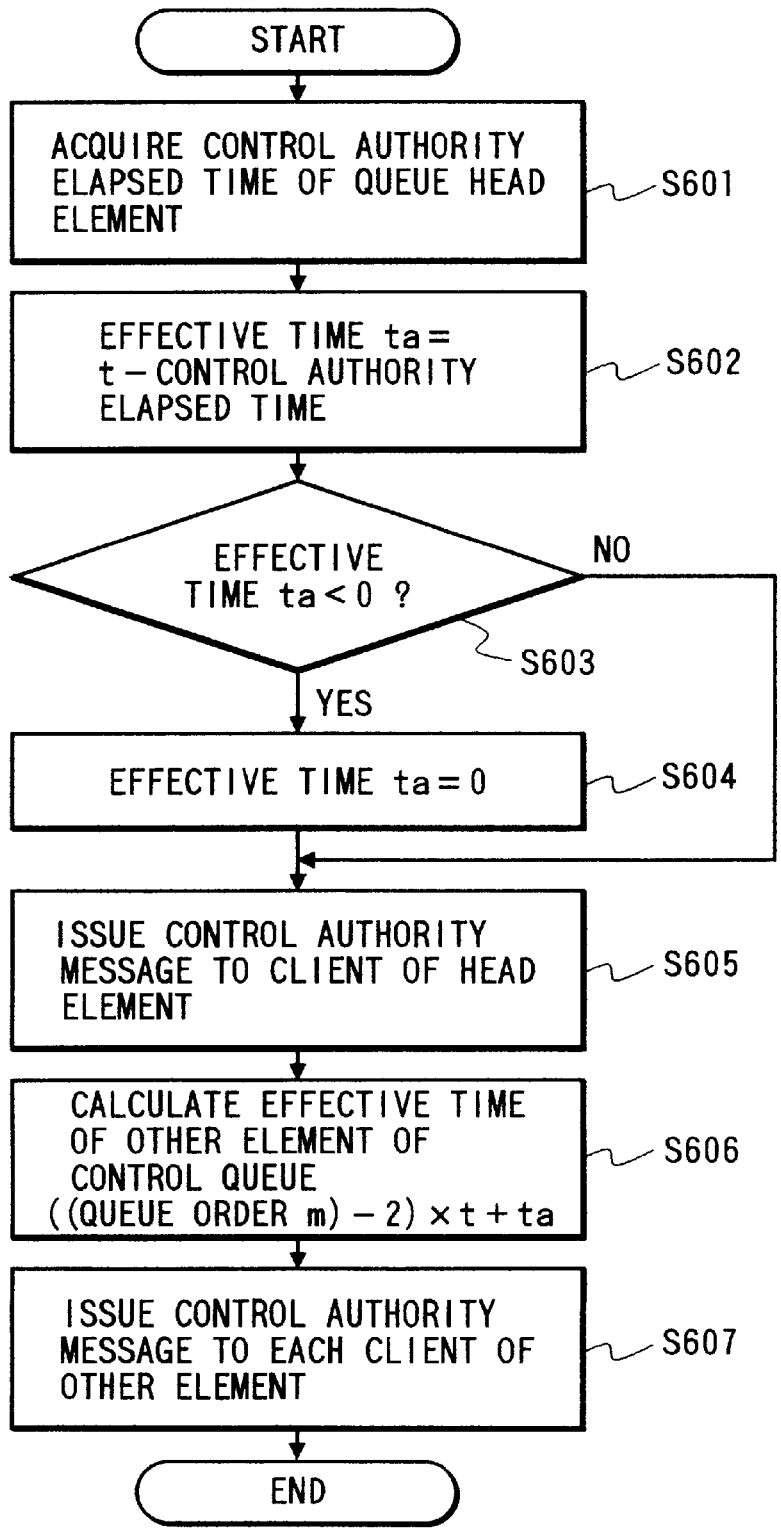
FIG. 8 is a flow chart for explaining the issuance sequence of a control authority message to a client corresponding to an element registered in the control queue.

FIG. 8 is a flow chart showing the issuance sequence of a control authority message to a client corresponding to each element registered in the control queue.

In step S601, the control authority elapsed time of the client corresponding to the head element in the control queue is acquired. In step S602, an "effective time ta" to be transmitted as the control authority message is calculated. The calculation formula is:

"effective time ta"

=t−(control authority elapsed time)

(t: maximum possession time of the control authority per client) As a result of this calculation, if the effective time ta becomes equal to or smaller than 0, the effective time ta is set at 0 (steps S603 and S604). This is to indicate that the control authority is being extended. Subsequently, in step S605, a control authority message is issued to the client corresponding to the head element. In this control authority message, "control authority is possessed" is set in the control status, and the effective time ta calculated in steps S601 to S604 is set in the effective time. If this processing is executed immediately after the head element has been deleted, the effective time ta=t is notified. Note that the effective time ta set in the control authority message in step S605 indicates the remained possession time of the control authority of the client corresponding to the head element in the control queue.

In step S606, the effective time is calculated for each element other than the head element registered in the control queue. In this case, the calculation formula is:

"effective time"

=((queue order m)−2)×t+(effective time ta)

where the queue order m is the order of the corresponding element in the control queue when the head element is first. For example, the queue order m of the element C23 in FIG. 3 is 3.

In step S607, control authority messages are issued to the elements other than the head element in the control queue. In the control authority message to each element, "control authority is being requested" is set in the control status, and "effective time" corresponding to that element calculated in step S606 is set in the effective time. Note that the effective time set in the control authority message in step S607 indicates the wait time until the corresponding client will be able to make camera control.

With the above-mentioned processing, in step S24, a control authority message 1203 including control status data 1228 set with "no control authority" is issued to the client corresponding to the deleted element. In step S25, a control authority message 1203 including control status data 1228 set with "control authority is possessed" and effective time data 1229 set with the maximum possession time t is issued to the client which has become the new head element as a result of subroutine SubA. For other clients, control authority messages 1203 including control status data 1228 set with "control authority is being requested" and effective time data 1229 set with wait times until acquirement of the control authority, which are calculated on the basis of the positions of the clients in the camera control queue, are issued.

As the control authority possession time to be set in step S22, the control start time of a new controllable client may be set or its control end time may be set. Alternatively, t indicating the control authority possession time may be set in a counter, timer, or the like. If the control start time is set, the difference between the current time and start time is compared with t in step S4; if the control end time is set, it is checked in step S4 if the current time has passed the control end time. On the other hand, if t is set in the counter, timer, or the like, the count up or time up of the counter or timer is checked in step S4.

As described above, when subroutine SubA is executed by substituting the head element in the argument id, the control authority is passed to the next element (from C21 to C22 in FIG. 3). In addition, measurement of the control authority possession time for the corresponding element is started.

Referring back to the flow charts in FIGS. 6A and 6B, after the flow exits subroutine SubA in step S5, since the head element in the queue has been updated and the client which issued the camera control request may have become a controllable client, it is checked again if the client which issued the camera control request is a controllable client (step S6). If the client which issued the camera control request is a controllable client, a camera control command and parameters are generated on the basis of the camera control parameter included in the camera control request message shown in FIG. 4B, and are sent to the camera control unit 11b via the drive I/F 305 (step S7). Upon receiving the camera control command and parameters, the camera control unit 11b sends an instruction based on the specifications of the camera 11a to the camera 11a (mechanism control unit 322) so as to control the camera 11a in practice. Upon reception of that instruction, the camera 11a executes tilting, panning, zooming, or the like in accordance with the instruction to change the image pickup view point.

In step S8, a camera attitude message is generated by acquiring the current tilt and pan angles and zoom ratio of the camera as a result of the camera control in step S7, and is issued to the clients.

If it is determined in step S2 that the received message is an abandonment notice, subroutine SubA described above is executed. In this case, the message sending client ID is set in the argument id to execute the subroutine (step S13). In subroutine SubA, if the argument id indicates the head element, the control authority possession time is set to measure the control authority elapsed time of the next controllable client (step S22), and thereafter, the corresponding element ID is deleted from the camera control queue (step S23). On the other hand, if the element ID designated by the argument id does not indicate the head element, the corresponding element ID is simply deleted from the camera control queue (step S23). In this manner, the corresponding element ID is deleted from the camera control queue in accordance with the abandonment notice message, thus updating the control queue. In steps S24 and S25, new control authority messages calculated for the individual clients are issued to the clients corresponding to the deleted element and elements registered in the control queue.

The camera control client in the camera control system of this embodiment will be described below.

Figure 9:
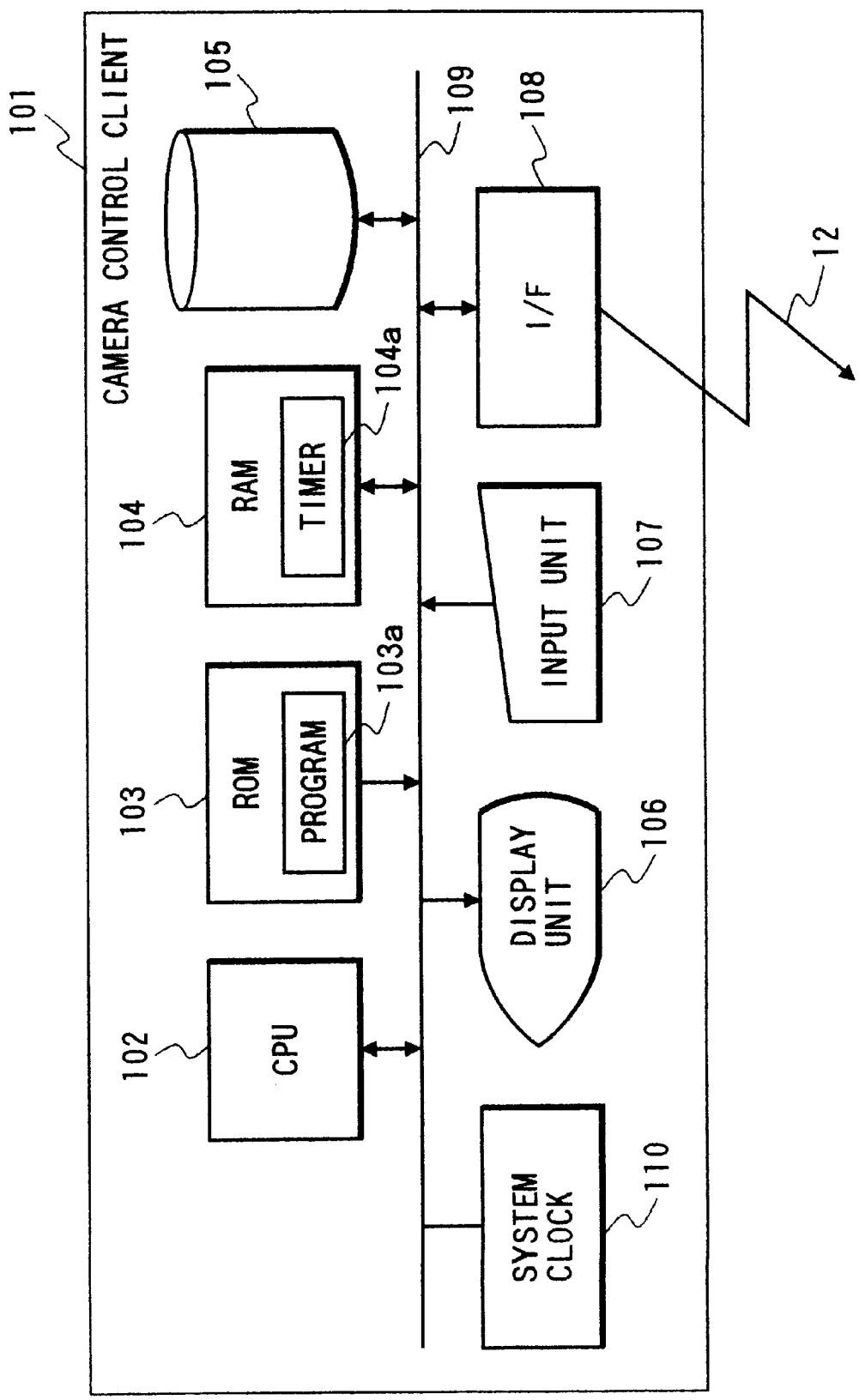
FIG. 9 is a block diagram showing the arrangement of a camera control client 101 in the first embodiment.

FIG. 9 is a block diagram showing the arrangement of the camera control client 101 of the first embodiment. Referring to FIG. 9, a CPU 102 executes various kinds of control on the basis of a control program 103a stored in a ROM 103. The ROM 103 stores various kinds of data and the like as well as the control program 103a. A RAM 104 provides a work area required when the CPU 102 executes various kinds of control. The RAM 104 has a timer 104a for storing a timer value. The function of the timer 104 will be described later.

An external storage device 105 comprises a magnetooptical disk (MO), compact disk (CDROM), hard disk, floppy disk, or the like. A display unit 106 comprises a CRT, a liquid crystal display, or the like, and makes various kinds of display under the control of the CPU 102. An input unit 107 comprises a pointing device, keyboard, and the like. A network I/F 108 communicates with various devices connected to the network 12 via the network 12. A bus 109 connects the above-mentioned components to allow intercommunications. Especially, in this embodiment, the client receives the video data message 1201, camera attitude message 1202, and control authority message 1203 from the camera control server 11, and transmits the camera control authority acquirement message 1101, camera control request message 1102, and abandonment notice message 1103 to the camera control server 11, as needed.

The message transmission and reception unit 13a, display control unit 13b, and operation input unit 13c shown in FIG. 1 correspond to functions implemented when the CPU 102 executes the control program stored in the ROM 103 or a control program loaded onto the RAM 104.

Figure 10:
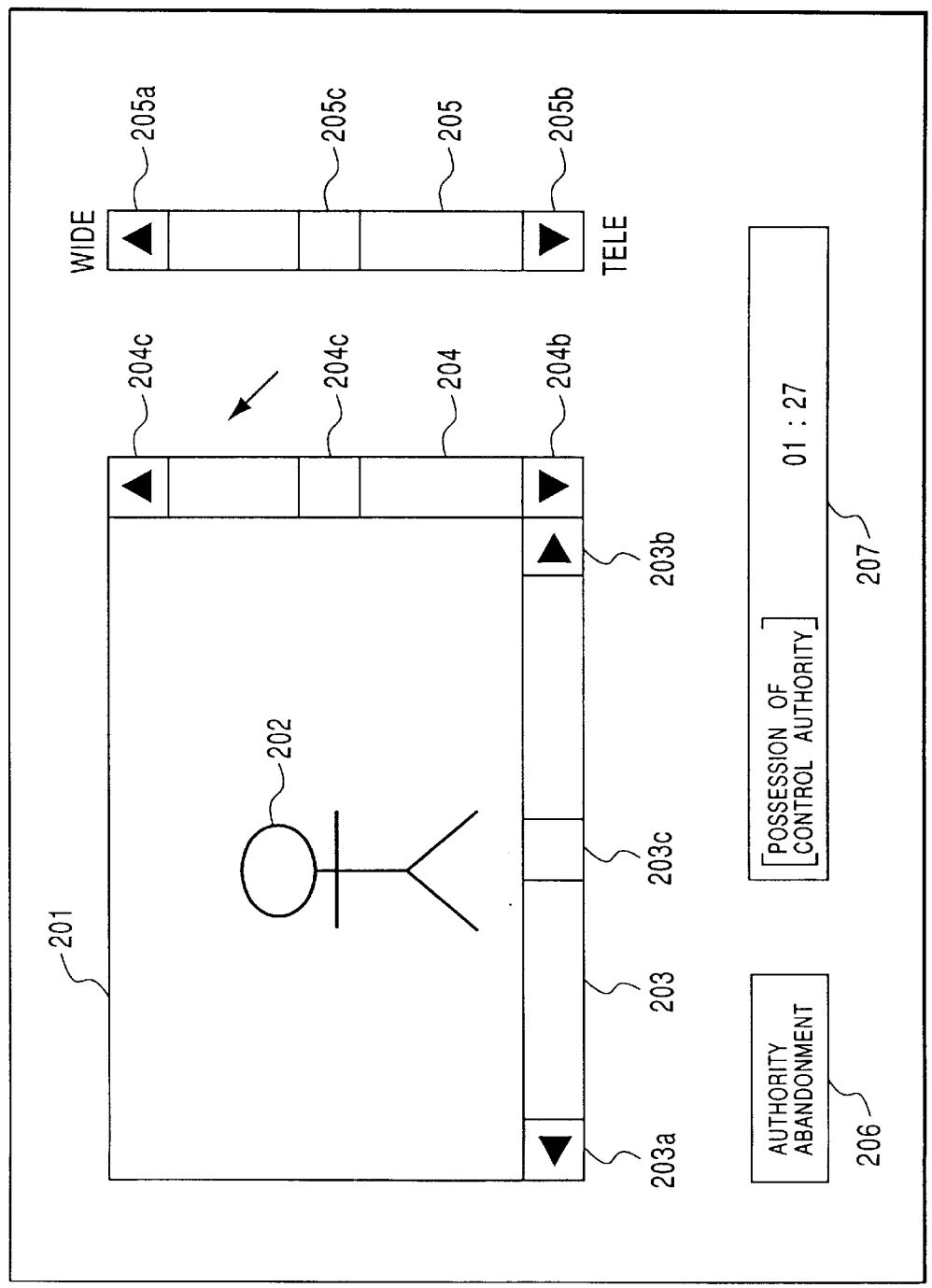
FIG. 10 shows an example of the display screen of the client 101.

FIG. 10 shows an example of the display screen of the client 101. A video display window 201 is a region for performing display based on the video data 1224 in the video data message 1201 sent from the camera control server 11. Scroll bars around the video display window 201 are used for instructing the image pickup directions of the camera. More specifically, a horizontal scroll bar 203 designates the pan angle of the camera, and a vertical scroll bar 204 designates the tilt angle. Also, a vertical scroll bar 205 is used for adjusting the zoom ratio of the camera. Buttons with suffices a and b (203a, 203b, and the like) of each scroll bar are used for moving the position of a button with suffix c (203c and the like) indicating the current position of the scroll bar little by little so as to issue a camera control instruction. Note that the camera control instruction can also be issued by dragging the button c using the pointing device to change its position.

A button 206 transmits a request associated with the camera control authority to the camera control server 11. A display on the button 206 changes depending on the camera control status of the corresponding client. For example, when the client has no camera control authority, "camera authority acquirement" is displayed; when the client has acquired the camera authority or is requesting acquisition of the camera control authority, "authority abandonment" is displayed. A display window 207 displays the current status of the control authority.

The operation of the camera control client according to the first embodiment will be described below. In the camera control client 101, message reception processing (FIG. 11) for processing a message received from the camera control server via the network 12, message issuance processing (FIG. 12) for issuing a message to the camera control server, and control status display processing (FIG. 13) for displaying the current control status are asynchronously executed.

Figure 11:
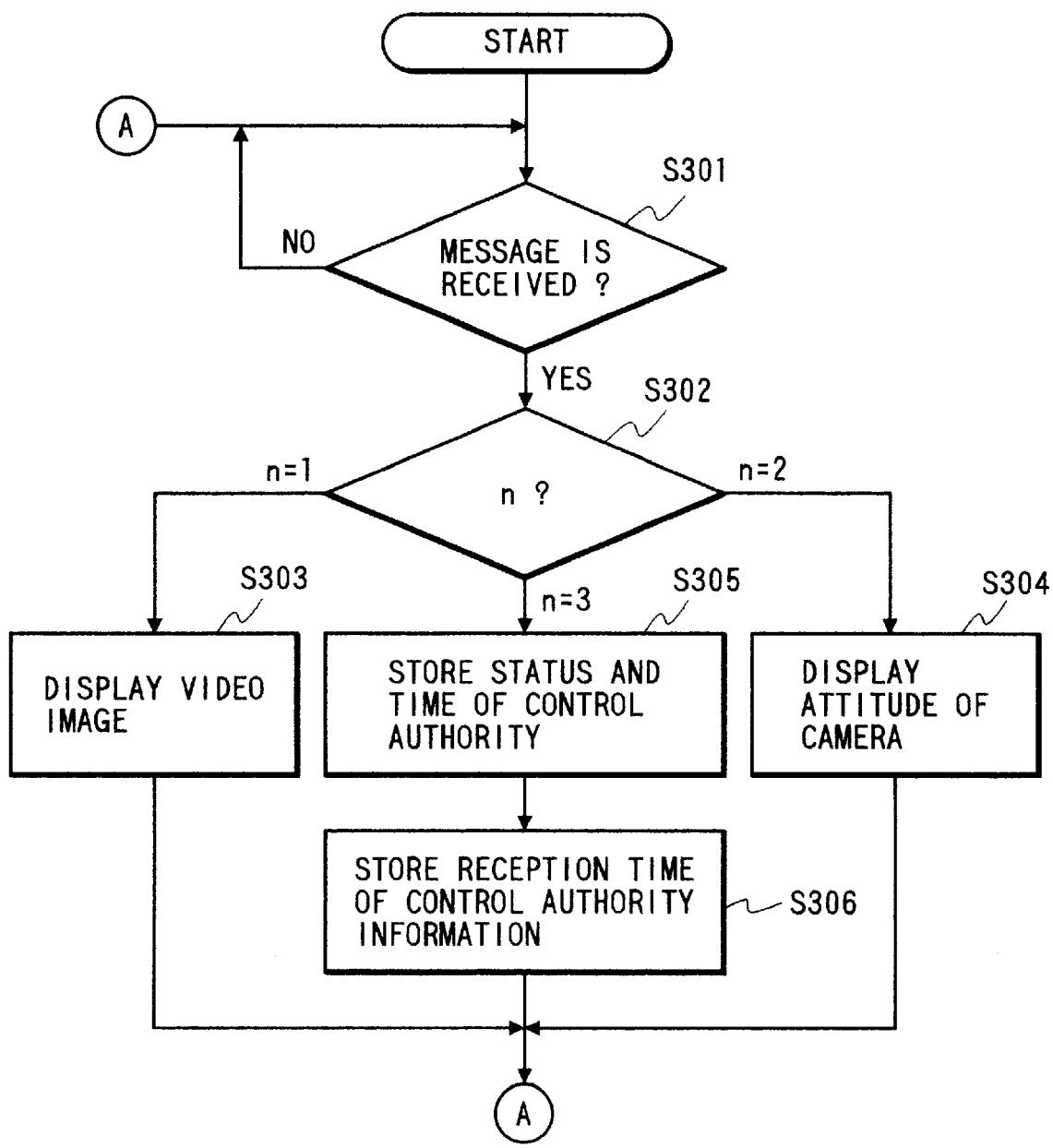
FIG. 11 is a flow chart showing the message reception processing by the camera control client of the first embodiment.

The message reception processing will be described below. FIG. 11 is a flow chart showing the message reception processing by the camera control client of this embodiment. In step S301, it is checked if the message transmission and reception unit 13a has received a message from the camera control server 11. If YES in step S301, the flow advances to step S302 to determine the type of the received message on the basis of the message ID included in that message. If the message ID is "1", since the received message is a video data message 1201, the flow advances to step S303 to display video data. In step S303, the display control unit 13b displays an image on the video display window 201 on the basis of the video data 1224 attached to the message at the frame rate indicated by the attribute information 1223. Thereafter, the flow returns to step S301 to wait for the next message reception.

On the other hand, if it is determined in step S302 if the message ID is "2", since the received message is a camera attitude message, the flow advances to step S304 to display the attitude of the camera. In step S304, the display control unit 13b updates the display positions of the buttons 203c, 204c, and 205c of the scroll bars 203, 204, and 205 on the basis of the pan angle 1225, tilt angle 1226, and zoom ratio 1227 included in the camera attitude message. The flow then returns to step S301 to wait for the next message reception.

Furthermore, if it is determined in step S302 that the message ID is "3", since the received message is a control authority message, the flow advances to step S305. In step S305, the control authority status (one of "no control authority", "control authority is being requested", and "control authority is possessed") is stored in the RAM 104 on the basis of the control status data 1228 in the received control authority message, and the effective time data 1229 in the control authority message is stored in the RAM 104. In step S306, the reception time of the control authority message is stored in the RAM 104. Thereafter, the flow returns to step S301 to wait for the next message reception. Note that the contents on the display window 207 are updated on the basis of the "control authority status", "effective time", and "reception time" stored in the RAM 104, and this control will be described later with reference to the flow chart in FIG. 13.

With the above-mentioned sequence, the signal sent from the camera control server is processed, and the camera status and the control authority status on the server side are reflected in the client.

Note that a video signal and signals indicating the camera status (attitude and control authority) may be transmitted separately. Such case is equivalent to the presence of video signal reception processing to be executed in addition to the above-mentioned processing.

Figure 12:
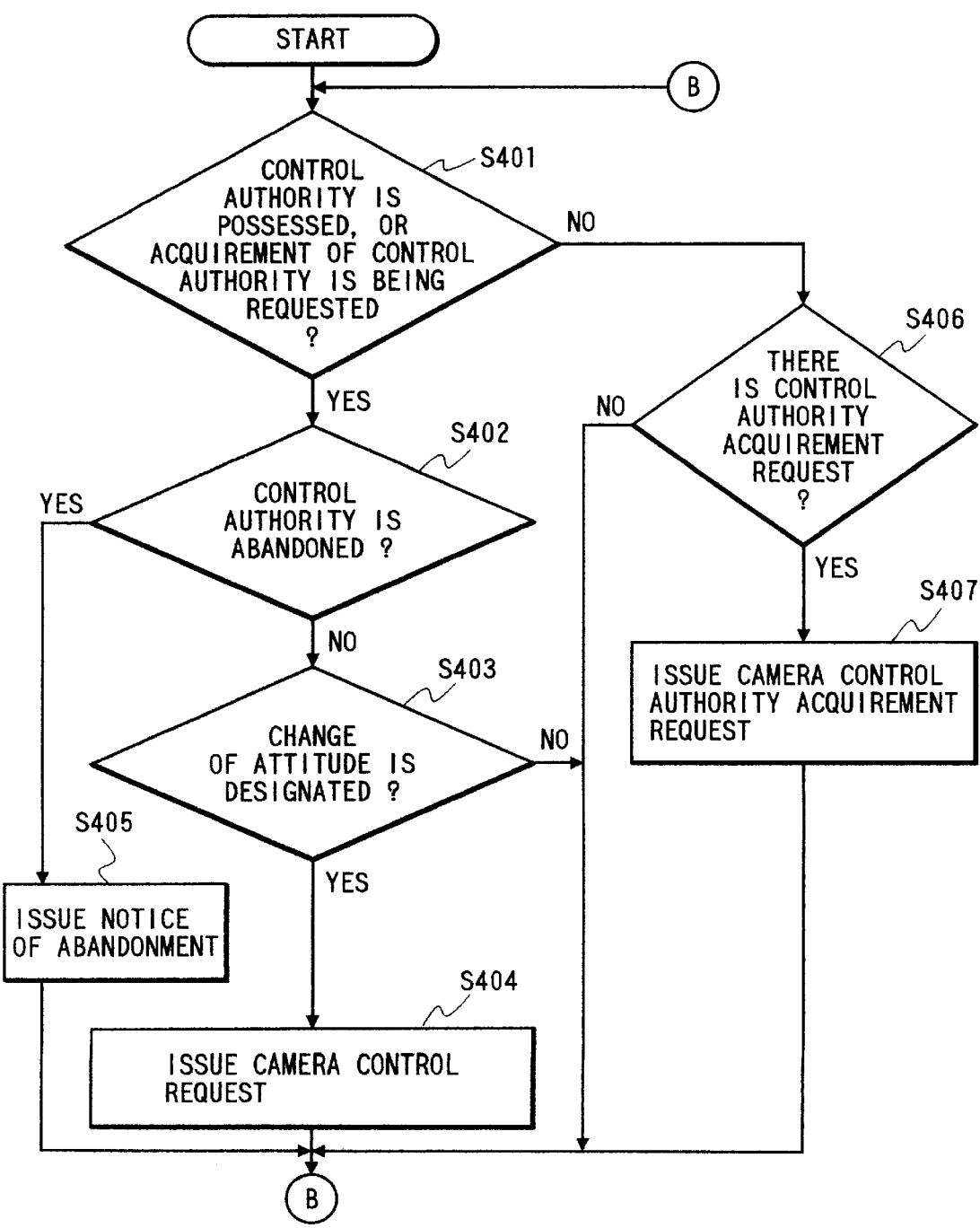
FIG. 12 is a flow chart showing the sequence of issuing a message from the camera control client of the first embodiment to the camera control server.

The processing for issuing a message from the client 101 to the camera control server 11 will be described below. FIG. 12 is a flow chart showing the sequence for issuing a message from the camera control client of this embodiment to the camera control server.

In step S401, it is checked if the client possesses the camera control authority or acquirement of the control authority is being requested. This step can be attained by checking the control authority status stored in the RAM 104 in step S305 above. If the control authority status is "control authority is possessed" or "control authority is being requested", the flow advances to step S402. In step S402, it is checked if the button 206 is operated. In this case, "authority abandonment" is displayed on the button 206, and when the button 206 is operated, it is determined that authority abandonment is designated. If authority abandonment is designated, the flow advances to step S405 to issue an abandonment notice 1103 (FIG. 4C). The flow then returns to step S401.

On the other hand, if it is determined in step S402 that authority abandonment is not designated, the flow advances to step S403 to check if a change of attitude is designated. When the button a, b, or c of one of the scroll bars 203, 204, and 205 is operated by, e.g., the pointing device, it is determined that a change of attitude is designated, and the flow advances to step S404. In step S404, a camera control request 1102 is generated on the basis of the contents of the attitude change designation (for example, when the button 203a of the horizontal scroll bar 203 is operated, the pan angle is moved to the left by a predetermined angle), and is issued to the camera control server. If neither control authority abandonment nor the change of attitude are designated, the flow returns to step S401 without any processing.

If it is determined in step S401 that the control authority status is "no control authority", the flow advances to step S406. It is checked in step S406 if the button 206 is operated. At this time, "control authority acquirement" is displayed on the button 206, and operating the button 206 designates a control authority acquirement request. That is, when the button 206 is operated, the flow advances to step S407. In step S407, a camera control authority acquirement request 1101 is generated, and is issued to the camera control server.

The operation sequence of the processing for transmitting a message from the client to the camera control server has been described. With this processing, when the control authority status is "control authority is being requested" or "control authority is possessed", a camera control request is issued to the camera control server.

Figure 13:
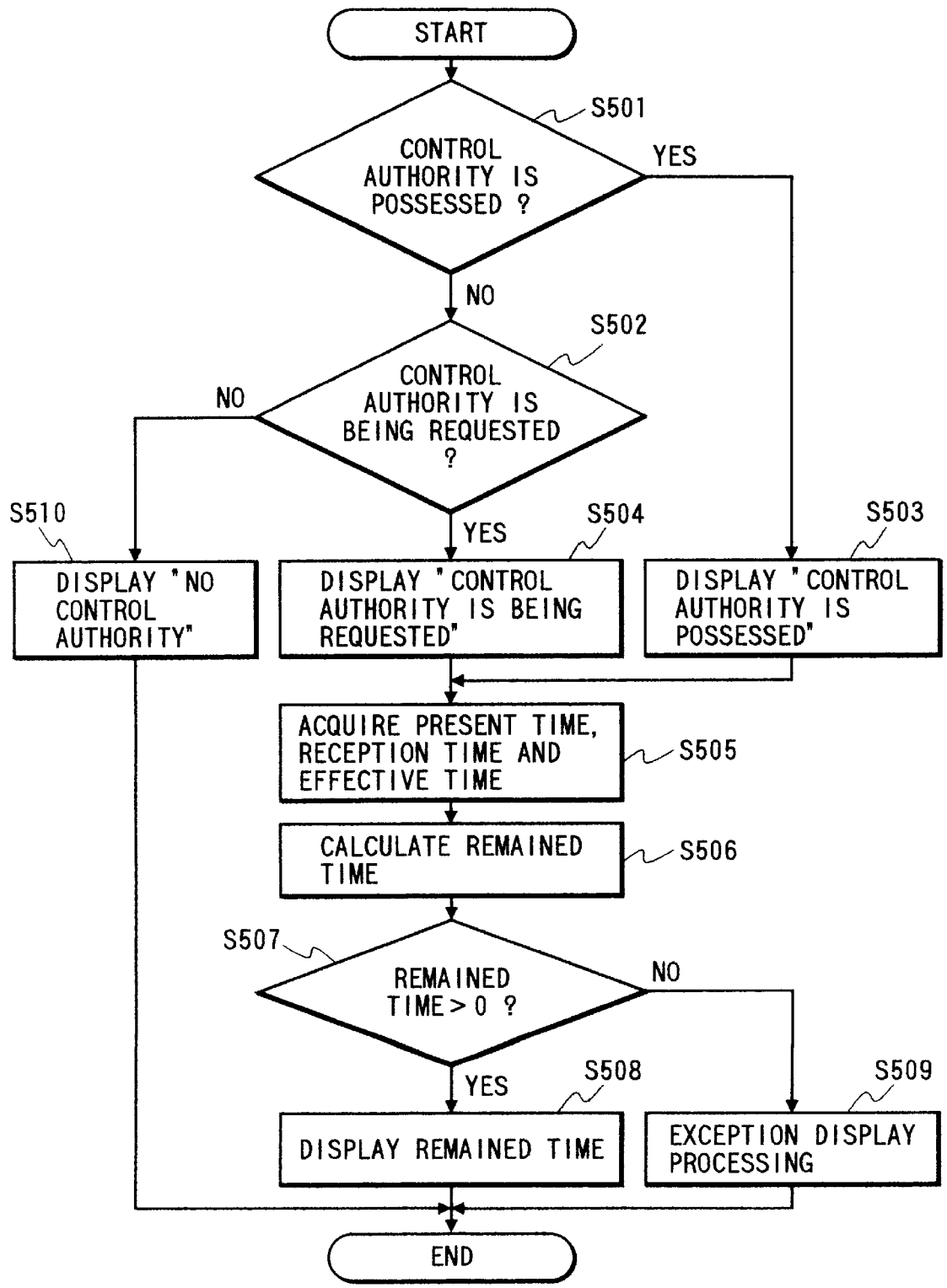
FIG. 13 is a flow chart for explaining the display sequence of the control authority status according to the first embodiment.

The processing for displaying the control authority status on the display window 207 will be described below. FIG. 13 is a flow chart for explaining the display sequence of the control authority status according to this embodiment. Note that this processing is executed at predetermined time intervals (e.g., 1-sec intervals) by timer processing. As the timer processing, for example, a clock pulse generator of a 1-sec period may be arranged, and its output may be used as an interrupt signal for the CPU 102. In this embodiment, system clocks 110 are counted, and the count value is used as a timer value 104a. Every time the timer value 104a has reached a predetermined value, the display processing of the control authority status is started.

It is checked in step S501 if the control authority status is "control authority is possessed", and it is checked in step S502 if the control authority status is "control authority is being requested". These processing steps are attained by referring to data indicating the control authority status stored in the RAM 104 as in step S401 above.

If the control authority status is "no control authority", the flow branches to "NO" in steps S501 and S502, and advances to step S510. In step S510, "no control authority" is displayed on the display window 207. Thereafter, this processing ends.

On the other hand, if the control authority status is "control authority is possessed", the flow advances from step S501 to step S503, and "control authority is possessed" is displayed on the display window 207. Thereafter, the flow advances to step S505 to display the remained possession time of the camera control authority. If the control authority status is "control authority is being requested", the flow advances from step S502 to step S504, and "control authority is being requested" is displayed on the display window 207. Thereafter, the flow advances to step S505 to display the wait time until acquirement of the control authority.

In step S505, the current time is acquired, and the reception time and effective time stored in steps S305 and S306 are acquired from the RAM 104. In step S506, the remained time is counted. The remained time is obtained by calculating:

remained time

=effective time−(current time−reception time)

In this manner, since the client counts the remained time on the basis of the effective time obtained from the camera control server, data need not be exchanged every time a remained time calculation is done, thus contributing to a traffic reduction on the network.

In step S507, it is checked if the wait time (remained time) counted in step S506 is positive. If YES in step S507, the wait time (remained time) is displayed on the display window 207 in step S508, thus ending this processing. On the other hand, if it is determined in step S507 that the wait time (remained time) is equal to or smaller than 0, the flow advances to step S509 to execute exception display processing, thus ending this processing. For example, when the control authority is acquired, if the effective time has elapsed, "control authority is now extended" is displayed on the display window 207. In this case, when another client issues a control authority acquirement request to the server, the client which currently has the control authority immediately loses the authority.

Figure 14A:
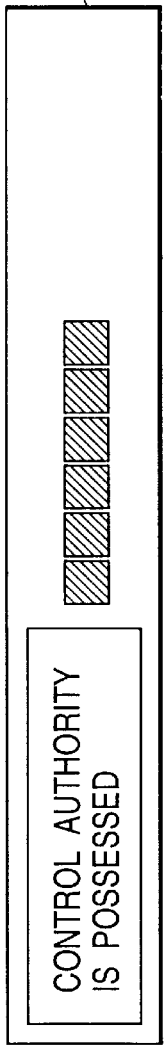
FIGS. 14A, 14B, 14C, 14D and 14E show display examples on a display window 207.
Figure 14B:
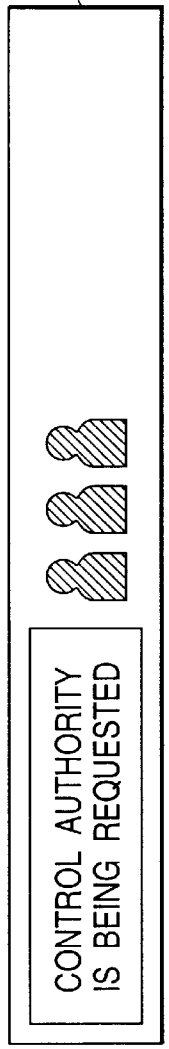
Figure 14C:
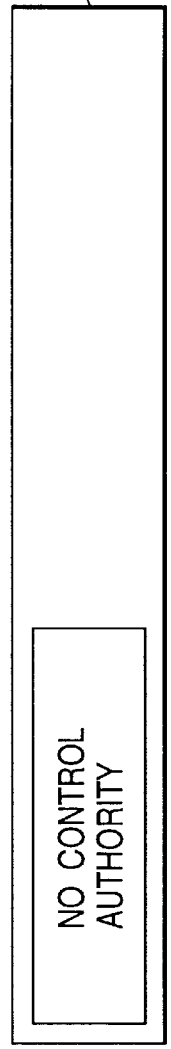
Figure 14D:
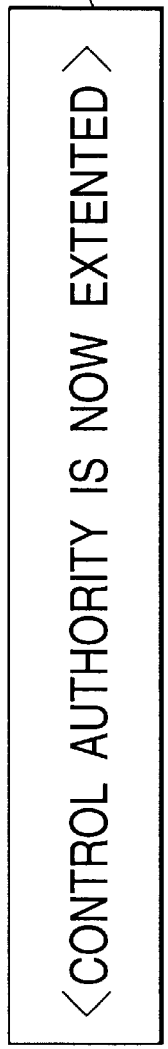
Figure 14E:
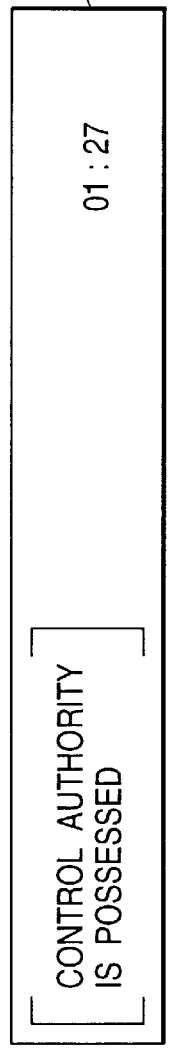

FIGS. 14A to 14E show display examples on the display window 207. FIG. 14E shows an example wherein the remained time calculated in the state "control authority is possessed" is directly digitally displayed. FIG. 14A shows an example wherein the remained time counted in the state "control authority is possessed" is indicated using an indicator. FIG. 14B shows an example wherein the remained time counted in the state "control authority is being requested" is indicated using an indicator. In FIG. 14B, the indicator patterns are different from those in case of "control authority is possessed", and the user can confirm at a glance whether the current status is "control authority is possessed" or "control authority is being requested". The wait time indicator in the state "control authority being requested" in FIG. 14B has a human shape, and each human pattern may correspond to one client in the control queue. In this case, the effective time data 1229 in the control authority message in steps S12 and S24 in FIGS. 6A, 6B and 7 represents the number of clients registered in the control queue before the client of interest.

Furthermore, FIG. 14C shows a display example on the display window 207 in case of "no control authority", and has no wait time (remained time) indication. FIG. 14D shows the display state on the display window while the control authority is being extended.

When the remained time or wait time is displayed using the indicator, as shown in FIG. 14A or 14B, either a relative method for setting the indicator at a maximum value based on the maximum value of the given control time (the first effective time acquired after the control authority status has changed), and setting the indicator at 0 when the wait time (remained time) becomes 0, or a method of assigning an absolute time (e.g., 10 sec) to one graduation of the indicator to display the time may be used.

When the relative display mode is used, the first effective time acquired after the control authority status has changed is set at the maximum value since a plurality of control authority messages including different effective times may be received in the state "control authority is being requested" according to the flow chart described above with the aid of FIGS. 6A and 6B. The reason why a plurality of control authority messages must be received during "control authority is being requested" is as follows. For example, when an element registered in the control queue abandons the authority, the effective time in the control authority request is shortened by the maximum effective time of the control authority assigned to a single client or the remained possession time of the control authority, and the actual wait time (remained time) becomes considerably different from that displayed on the display window 207 on the client side. Hence, when the element is deleted from the control queue, a control authority message is issued, and the wait time (remained time) on the display window 207 must be corrected in accordance with the effective time information in that message. For this purpose, the camera control server and the camera control client exchange a plurality of control authority messages during "control authority is being requested".

As described above, according to the first embodiment, each client counts the wait time or remained time of the control authority on the basis of the camera control authority message sent from the camera control server, and displays the obtained time on the display window 207 together with the current control authority status of that client at predetermined time intervals. Hence, the operator at each client can recognize the control authority relationship with the server and the wait time (or remained time) of the control authority, thus improving the operability.

In the above embodiment, a single camera is connected to a single camera control server. However, needless to say, a plurality of cameras may be connected to a single camera server.

The second embodiment of the present invention controls passing of the control authority on the basis of whether or not another client which issued a control authority acquirement request is registered in the control queue, as the method of managing passing of the camera control authority on the basis of the presence/absence of the camera control request. The operation processing of a camera control server of this embodiment will be described below.

Figure 15:
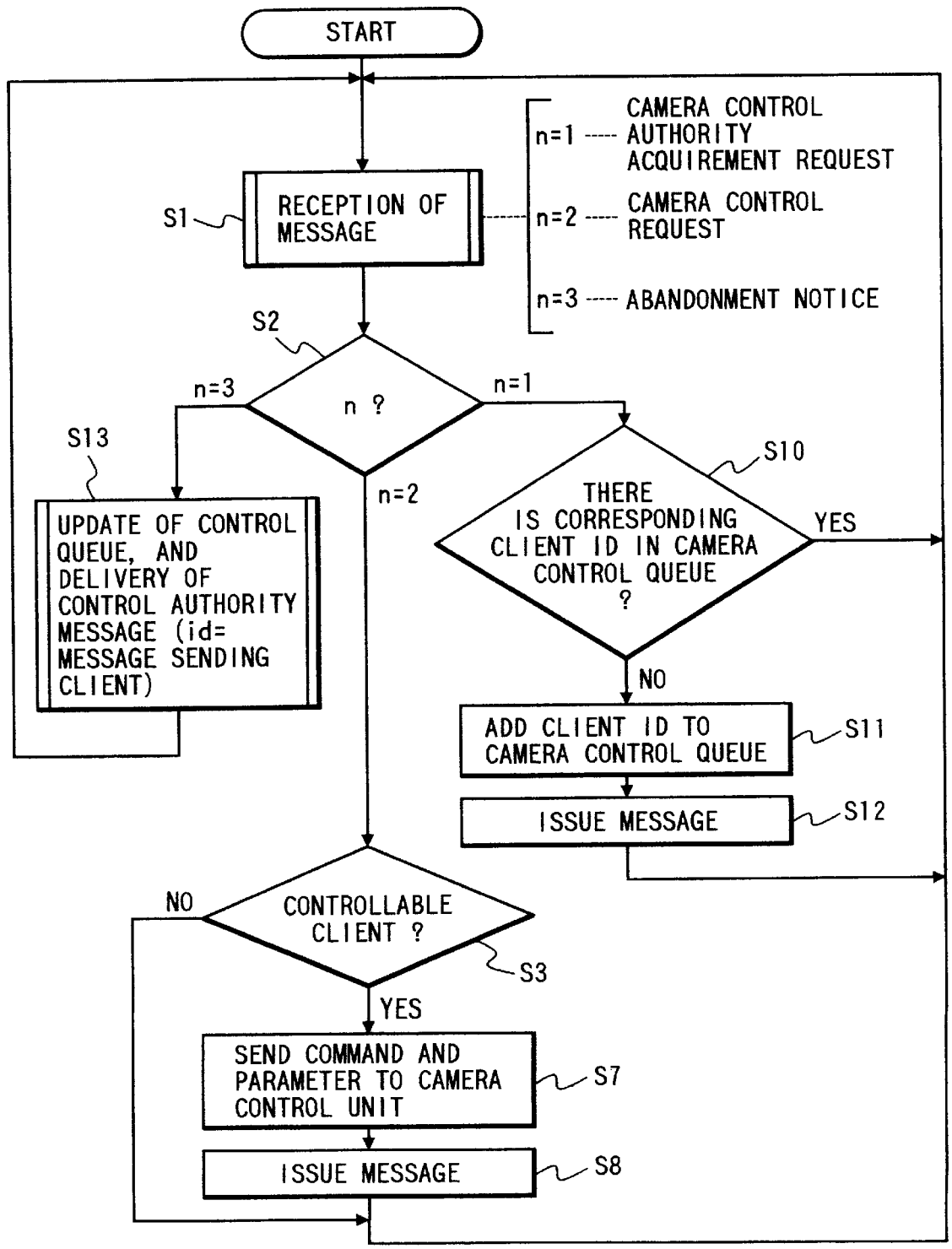
FIG. 15 is a flow chart for explaining the management control of the camera control authority of a camera control server according to the second embodiment of the present invention.
Figure 16:
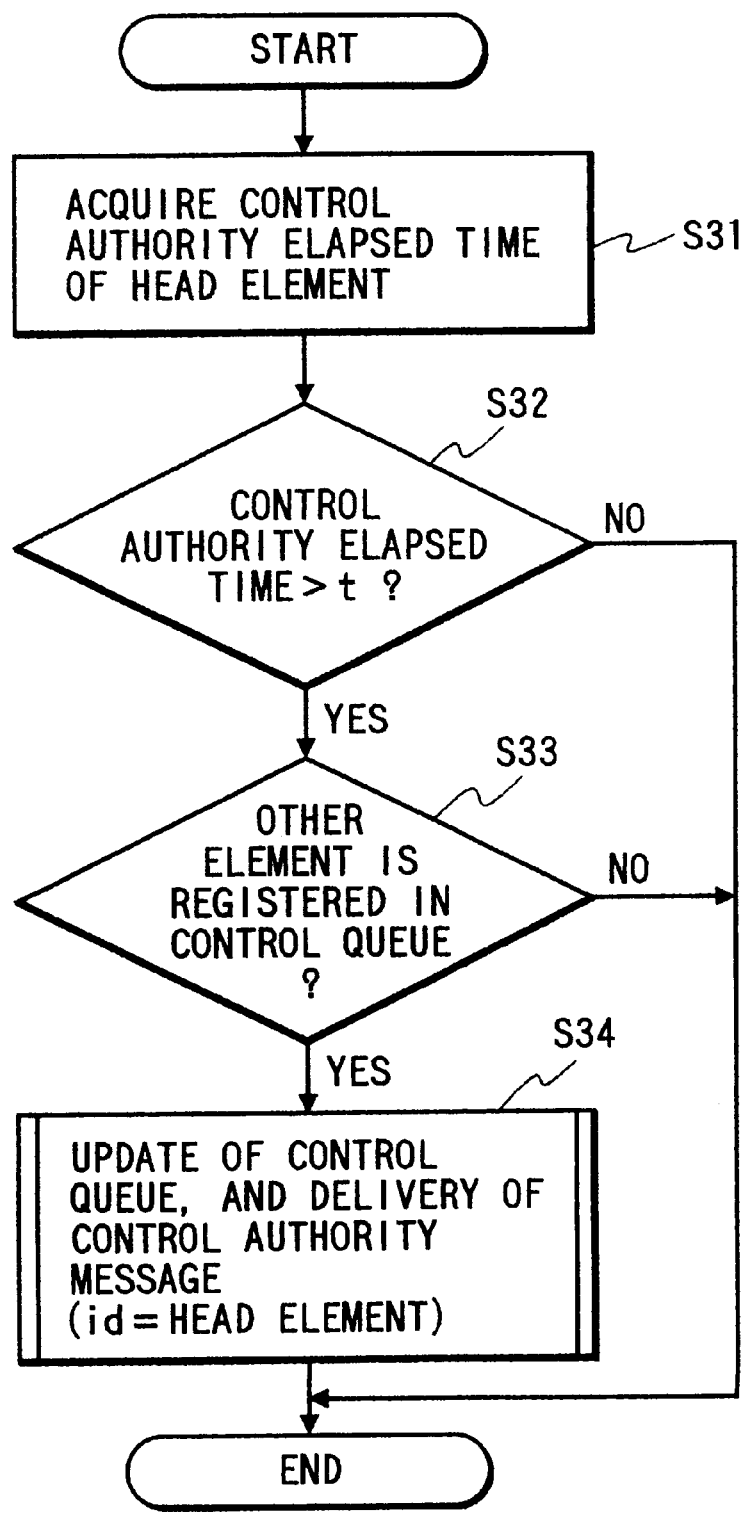
FIG. 16 is a flow chart for explaining the management control of the camera control authority of the camera control server according to the second embodiment of the present invention.

FIGS. 15 and 16 are flow charts for explaining the management control of the camera control authority by the camera control server according to the second embodiment. The same step numbers in the flow chart shown in FIG. 15 denote the steps with the same processing contents as in FIGS. 6A and 6B. If it is determined in step S3 that the client which issued the camera control request is a controllable client, camera control is executed in step S7, and a camera attitude message 1202 (FIG. SB) is issued in step S8. On the other hand, if the client which issued the camera control request is not a controllable client, the flow returns to step S1.

The passing management of the camera control authority to a client registered in the control queue is implemented in the sequence shown in the flow chart of FIG. 16. Note that the processing shown in the flow chart of FIG. 16 is repetitively executed at predetermined time intervals (e.g., 1-sec intervals).

In step S31, the time after the head element in the control queue has acquired the control authority, i.e., the control authority elapsed time, is acquired. It is checked in step S32 if the control authority elapsed time has exceeded a maximum possession time t. If NO in step S32, since the control authority can be kept granted, this processing ends. On the other hand, if it is determined in step S32 that the control authority elapsed time has exceeded the maximum possession time t, the flow advances to step S33 to check if another element is registered in the control queue. If the head element alone is registered in the control queue, since the control authority need not be passed, this processing ends. On the other hand, if it is determined in step S33 at least one element is registered in the control queue in addition to the head element, the flow advances to step S34, and the current head element, the control authority elapsed time of which has expired, is deleted from the camera control queue. The processing to be executed in step S34 is as has already been described above with the aid of FIGS. 7 and 8.

When the above-mentioned camera control server executes the management control for the camera control clients that has been described in the first embodiment, the control status can be appropriately displayed for users.

In the first and second embodiments, each client stores the effective time set in the control authority message sent from the camera control server 11, and updates by itself the remained time with the elapse of time. In the third embodiment, the server calculates the remained time of the control authority status, and transmits the calculated time to a client upon receiving a message associated with camera control from the client.

Figure 17B:
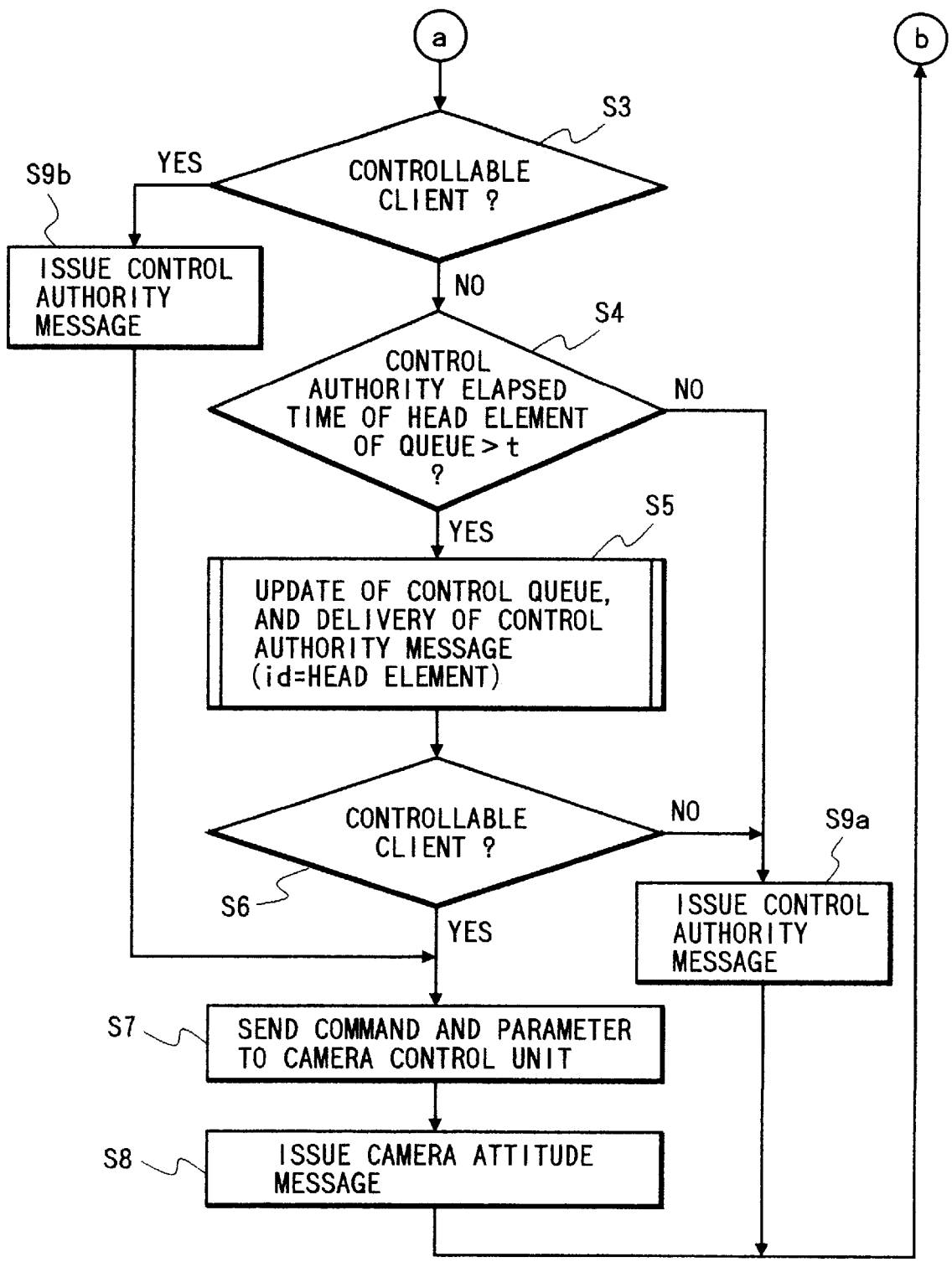
FIG. 17 comprised of FIGS. 17A and 17B, is a flow chart for explaining the processing sequence of a camera control server according to the third embodiment of the present invention.

FIGS. 17A and 17B are flow charts for explaining the processing sequence of a camera control server according to the third embodiment. The same step numbers in FIGS. 17A and 17B denote the same steps with the same processing contents as those in the sequence (FIGS. 6A and 6B) described in the first embodiment. The difference between the processing sequences of the third and first embodiments is that steps S9a and S9b are inserted, and step S14 is added in place of step S12.

In steps S9a, S9b, and S14, the control authority remained time is calculated for a client corresponding to the head element of those registered in the camera control queue and is set in the effective time of the control authority message, and the message is issued to that client. For each of the elements other than the head element in the control queue, the wait time until acquirement of the control authority is calculated and set in the effective time of the control authority message, and the message is issued to the corresponding client. That is, in steps S9a, S9b, and S14, the processing described above with reference to FIG. 8 is done.

With this sequence, every time one of the camera control authority acquirement request, camera control request, and abandonment notice is received, the camera control authority messages are issued to clients corresponding to the elements registered in the control queue. For this reason, each client can acquire its own control status and its wait time. Hence, each client displays the acquired wait time on the display window 207, thus notifying the operator of the control status and the wait time until its acquirement.

Figure 18:
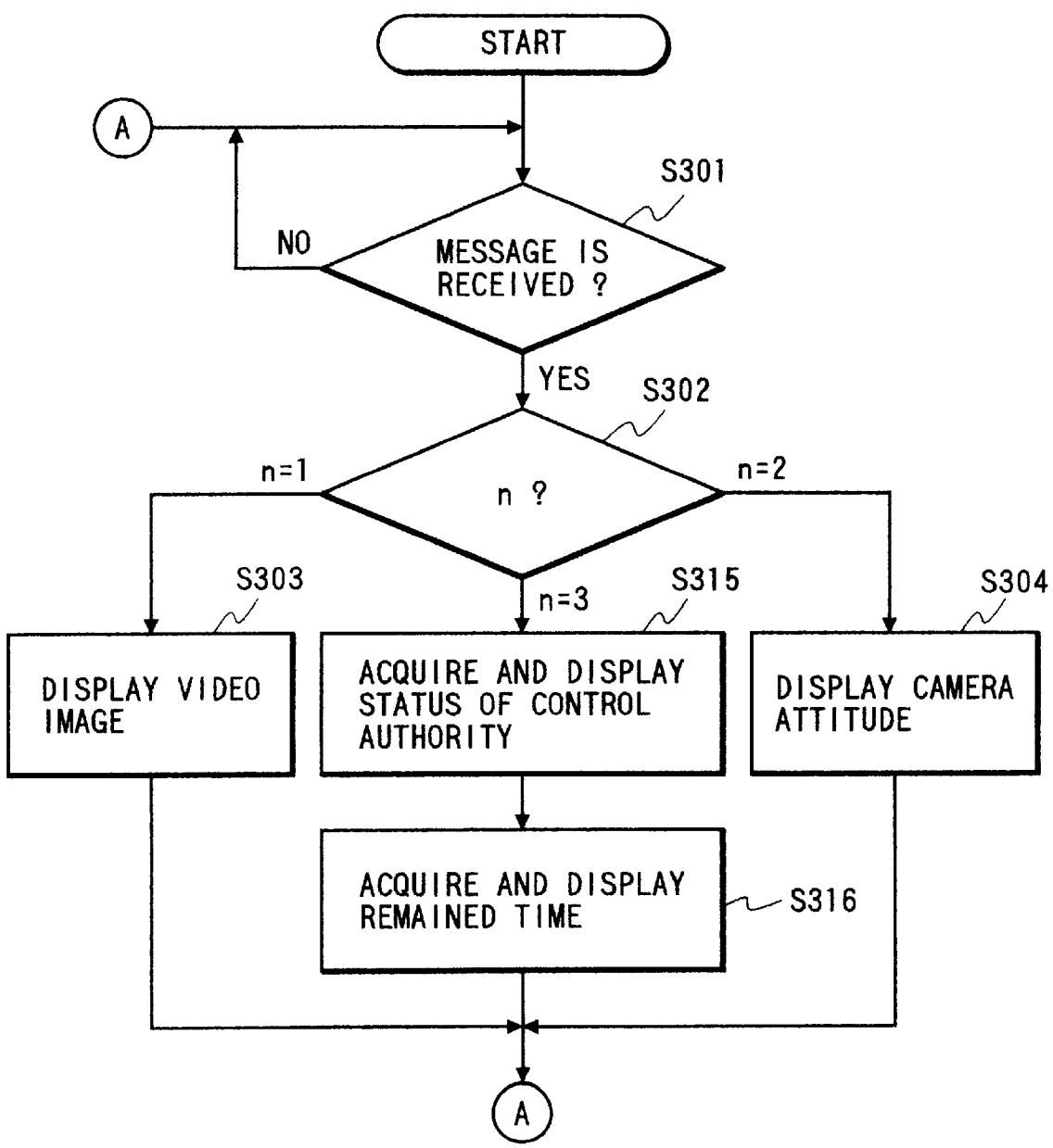
FIG. 18 is a flow chart showing the message reception processing of a client according to the third embodiment.

FIG. 18 is a flow chart showing the message reception processing at the client according to the third embodiment. The same step numbers in FIG. 18 denote the steps (S301 to S304) with the same processing contents as those in the message reception processing in the first embodiment, and a detailed description thereof will be omitted. The client of the third embodiment need only display "control authority status" and "effective time" sent by the control authority message. Hence, upon receiving the control authority message, the flow advances from step S302 to step S315, and the control status data 1228 in the control authority message is acquired to display one of "control authority is possessed", "control authority is being requested", and "no control authority" on the display window 207 (FIG. 10). Subsequently, in step S316, the effective time data 1229 is acquired from the control authority message and is displayed as the wait time on the display window 207.

In the third embodiment, according to the sequence shown in FIGS. 17A and 17B, upon receiving a message associated with camera control from a certain client, the control authority messages are distributed to clients registered in the control queue. However, the control authority message distribution timing is not limited to this. For example, the camera control server may distribute control authority messages at predetermined time intervals. In this case, the control sequence shown in FIG. 8 may be executed at predetermined time intervals (e.g., 5-sec intervals). With this processing, each client can periodically acquire the control status and its wait time (remained time).

In each of the above embodiments, the maximum possession time t of the camera control authority for each client is constant. However, priority levels may be assigned to the clients, and the maximum possession time may differ in correspondence with the priority levels. In this case, a table shown in FIG. 19 may be assured on the camera control server, and maximum possession times are registered in the table in correspondence with clients. Upon calculating the effective time of each element in the control queue, the registered maximum possession time is referred to.

When the camera control server changes the registration order to the control queue on the basis of the priority levels, the first to third embodiments described above can be applied. This is because the effective time can be calculated based on the order in the control queue even when the positions in the control queue change based on the priority levels.

As described above, according to the camera control system of each of the above embodiments, since each client can acquire information associated with the management state of the control authority, it can recognize its camera control authority status (the wait time until acquirement of the control authority, the remained possession time of the control authority, and the like) and can present information to the operator on the basis of the acquired information. For this reason, the operator can know the remained time of the control of a remote camera or the wait time until acquirement of the control authority. Hence, the operator can easily detect changes in control authority status, thus improving the operability.

When widely different embodiments of the present invention may be constructed without departing from the spirit and scope of the present invention. It should be understood that the present invention is not limited to the specific embodiments described in the specification, except as defined in the appended claims.

What is claimed is:

1. A camera control system which allows a remote client to control a video camera, comprising:
 a camera control server for controlling the video camera connected thereto, said camera control server including
  registration means which can register a plurality of clients which issued acquirement requests of a control authority in a queue for acquiring the control authority of the video camera,
  calculation means for calculating wait times until acquirement of the control authority for clients which are registered by said registration means and have no control authority, and
  output means for outputting the wait times calculated by said calculation means to the corresponding clients; and
 a client which can control the video camera from a remote place, said client including
  issuance means for issuing an acquirement request of the control authority to said camera control server,
  count means for counting a wait time until acquirement of the control authority of the video camera on the basis of the wait time received from said camera control server, and
  display means for displaying the wait time counted by said count means.

2. A system according to claim 1, wherein for a client which has acquired the control authority of the video camera, said calculation means calculates a remained controllable time of the video camera and said output means outputs the remained time.

3. A system according to claim 1, wherein said client further includes abandonment notice means for supplying an abandonment notice of the control authority of the video camera or the acquirement request of the control authority to said camera control server.

4. A system according to claim 3, wherein said output means outputs the corresponding wait times to the clients which have no control authority, in accordance with receiving the abandonment notice of the control authority of the video camera or the acquirement request of the control authority from said client.

5. A system according to claim 2, wherein said client further includes abandonment notice means for supplying an abandonment notice of the control authority of the video camera or the acquirement request of the control authority to said camera control server.

6. A system according to claim 5, wherein said output means outputs the remained time to a client which newly acquires the control authority, in accordance with receiving the abandonment notice of the control authority of the video camera or the acquirement request of the control authority from said client.

7. A system according to claim 1, wherein said camera control server calculates the wait times by said calculation means at predetermined time intervals, and outputs the calculated wait times to the clients which have no control authority by said output means.

8. A system according to claim 1, wherein said calculation means calculates the wait times and said output means outputs the calculated wait times to the clients which have no control authority, in response that a new client is registered by said registration means.

9. A camera control server for controlling a video camera on the basis of a control command from a remote client, comprising:

registration means which can register a plurality of clients which issued acquirement requests of a control authority in a queue for acquiring the control authority of the video camera;

calculation means for calculating wait times until acquirement of the control authority for clients which are registered by said registration means and have no control authority; and output means for outputting the wait times calculated by said calculation means to the corresponding clients.

10. A server according to claim 9, wherein for a client which has acquired the control authority of the video camera, said calculation means calculates a remained controllable time of the video camera and said output means outputs the remained time.

11. A server according to claim 9, wherein said output means outputs the corresponding wait times to the clients which have no control authority, in accordance with receiving an abandonment notice of the control authority of the video camera or the acquirement request of the control authority from said client.

12. A server according to claim 9, wherein said output means outputs the remained time to a client which newly acquires the control authority, in accordance with receiving an abandonment notice of the control authority of the video camera or the acquirement request of the control authority from said client.

13. A server according to claim 9, wherein said calculation means calculates the wait times and said output means outputs the calculated wait times to the clients which have no control authority, in response that a new client is registered by said registration means.

14. A method of controlling a camera control system which allows a remote client to control a video camera, comprising:

an issuance step of issuing an acquirement request of a control authority on the client side;

a registration step of allowing to register a plurality of clients which issued the acquirement requests of the control authority in a queue for acquiring the control authority of the video camera;

a calculation step of calculating wait times until acquirement of the control authority for clients which are registered in the registration step and have no control authority;

an output step of outputting the wait times calculated in the calculation step to the corresponding clients;

a count step of counting a wait time until acquirement of the control authority of the video camera on the basis of the wait time received from a camera control server; and a display step of displaying the wait time counted in the count step.

15. A method according to claim 14, wherein for a client which has acquired the control authority of the video camera, a remained controllable time of the video camera is calculated in the calculation step and the remained time is output in the output step.

16. A method according to claim 14, wherein the corresponding wait times are output to the clients which have no control authority in the output step, in accordance with receiving an abandonment notice of the control authority of the video camera or the acquirement request of the control authority from the client.

17. A method according to claim 15, wherein the remained time is output to a client which newly acquires the control authority in the output step, in accordance with receiving an abandonment notice of the control authority of the video camera or the acquirement request of the control authority from the client.

18. A method according to claim 14, wherein the wait times are calculated in the calculation step, and the calculated wait times are to the clients which have no control authority in the output step, in response that a new client is registered in the registration step.

19. A storage medium that stores a program for implementing processing of a camera control server for controlling a video camera on the basis of a control command from a remote client, said storage medium storing programs for implementing the processing steps of:

registering a plurality of clients which issued acquirement requests of a control authority in a queue upon acquiring the control authority of the video camera;

calculating wait times until acquirement of the control authority for clients which are registered in the queue and have no control authority; and outputting the wait times to the corresponding clients.

20. A medium according to claim 19, further storing programs for implementing the processing steps of: calculating a remained controllable time of the video camera; and outputting the remained time.

21. A medium according to claim 19, further storing a program for implementing the processing step of outputting the corresponding wait times to the clients which have no control authority in accordance with receiving an abandonment notice of the control authority of the video camera or the acquirement request of the control authority from the client.

22. A medium according to claim 19, further storing a program for implementing the processing step of outputting the remained time to a client which newly acquires the control authority in accordance with receiving an abandonment notice of the control authority of the video camera or the acquirement request of the control authority from the client.

23. A medium according to claim 19, further storing programs for implementing the processing steps of calculating the wait times; and outputting the calculated wait times to the clients which have no control authority, in response that a new client is registered in the queue.

24. A client which can remote-control a video camera connected to a camera server, comprising:

issuance means for issuing an acquirement request of a control authority to the camera control server;

reception means for, when said client has no control authority, receiving a wait time until acquirement of the control authority calculated by the camera server;

count means for counting a wait time until acquirement of the control authority of the video camera on the basis of the wait time received by said reception means; and display means for displaying the wait time counted by said count means.

25. A client according to claim 24, wherein when said client has acquired the control authority, said reception means can receive a remained controllable time of the video camera calculated by the camera server, and said count means can count a remained possession time of the control authority.

26. A client according to claim 24, further comprising abandonment notice means for supplying an abandonment notice of the control authority of the video camera or the acquirement request of the control authority to the camera server.

* * * * *

UNITED STATES PATENT AND TRADEMARK OFFICE
CERTIFICATE OF CORRECTION

| | | |
|---|---|---|
| PATENT NO. | : 6,133,941 | Page 1 of 1 |
| APPLICATION NO. | : 08/956552 | |
| DATED | : October 17, 2000 | |
| INVENTOR(S) | : Eita Ono | |

It is certified that error appears in the above-identified patent and that said Letters Patent is hereby corrected as shown below:

ON THE COVER PAGE, ITEM [54], and in Col. 1, lines 1-7:

Delete the title and insert therefor

-- CAMERA CONTROL SYSTEM, APPARATUS, AND METHOD --

IN THE SPECIFICATION:

In Col. 14, line 16, "(FIG. SB)" should read -- (FIG. 5B) --

Signed and Sealed this

Seventeenth Day of July, 2007

JON W. DUDAS
*Director of the United States Patent and Trademark Office*